(12) United States Patent
Cyrus et al.

(10) Patent No.: US 12,214,806 B2
(45) Date of Patent: Feb. 4, 2025

(54) ROBOTIC SOURCE DETECTION DEVICE AND METHOD

(71) Applicant: Lunar Outpost Inc., Golden, CO (US)

(72) Inventors: Justin Cyrus, Golden, CO (US); Andrew Josef (AJ) Gemer, Lafayette, CO (US); Van Wagner, Lakewood, CO (US); Ben Brokaw, Golden, CO (US)

(73) Assignee: Lunar Outpost Inc., Golden, CO (US)

( * ) Notice: Subject to any disclaimer, the term of this patent is extended or adjusted under 35 U.S.C. 154(b) by 537 days.

(21) Appl. No.: 17/399,840

(22) Filed: Aug. 11, 2021

(65) Prior Publication Data

US 2023/0051111 A1 Feb. 16, 2023

(51) Int. Cl.
| | |
|---|---|
| *B60L 3/00* | (2019.01) |
| *B60K 1/02* | (2006.01) |
| *B60K 17/34* | (2006.01) |
| *B60L 15/20* | (2006.01) |
| *B60W 60/00* | (2020.01) |
| *G01C 21/16* | (2006.01) |
| *G01M 3/04* | (2006.01) |
| *G01S 19/01* | (2010.01) |

(Continued)

(52) U.S. Cl.
CPC ........... *B60W 60/0025* (2020.02); *B60K 1/02* (2013.01); *B60K 17/358* (2013.01); *B60L 15/20* (2013.01); *G01C 21/16* (2013.01); *G01M 3/04* (2013.01); *G01S 19/01* (2013.01); *G05D 1/0038* (2013.01); *G06F 18/251* (2023.01); *G06T 1/0014* (2013.01); *G06T 1/20* (2013.01); *G06V 20/10* (2022.01); *H04N 7/183* (2013.01); *H04N 23/695* (2023.01); *B60W 2420/403* (2013.01)

(58) Field of Classification Search
CPC . B60W 60/0025; B60W 2420/42; B60K 1/02; B60K 17/358; B60K 2007/0046; B60K 7/0007; B60L 15/20; B60L 2200/40; B60L 2220/42; B60L 2220/46; B60L 2240/62; B60L 2260/32; B60L 3/00; G01C 21/16; G01C 21/30; G01M 3/04; G01M 3/002; G01M 3/38; G01M 3/005; G01S 19/01; G05D 1/0038; G05D 2201/0207; G05D 2201/0209; G05D 1/0044; G06F 18/251; G06T 1/0014; G06T 1/20; G06V 20/10; G06V 20/56; H04N 7/183; H04N 23/695; H04N 7/188
USPC .......................................................... 701/2
See application file for complete search history.

(56) References Cited

U.S. PATENT DOCUMENTS

| | | | |
|---|---|---|---|
| 2006/0010844 A1* | 1/2006 | Angott | .................... B60L 50/61 56/7 |
| 2010/0002911 A1* | 1/2010 | Wu | ........................ B60W 30/12 382/104 |

(Continued)

*Primary Examiner* — Shardul D Patel

(57) ABSTRACT

An autonomous robotic vehicle is capable of detecting, identifying, and locating the source of gas leaks such as methane. Because of the number of operating components within the vehicle, it may also be considered a robotic system. The robotic vehicle can be remotely operated or can move autonomously within a jobsite. The vehicle selectively deploys a source detection device that precisely locates the source of a leak. The vehicle relays data to stakeholders and remains powered that enables operation of the vehicle over an extended period. Monitoring and control of the vehicle is enabled through a software interface viewable to a user on a mobile communications device or personal computer.

20 Claims, 14 Drawing Sheets

(51) Int. Cl.
*G05D 1/00* (2006.01)
*G06F 18/25* (2023.01)
*G06T 1/00* (2006.01)
*G06T 1/20* (2006.01)
*G06V 20/10* (2022.01)
*H04N 7/18* (2006.01)
*H04N 23/695* (2023.01)

(56) References Cited

U.S. PATENT DOCUMENTS

| | | | | |
|---|---|---|---|---|
| 2012/0078417 | A1* | 3/2012 | Connell, II | G01K 3/14 |
| | | | | 901/1 |
| 2013/0215110 | A1* | 8/2013 | Rivera | G06T 19/00 |
| | | | | 345/419 |
| 2015/0273687 | A1* | 10/2015 | Greene | B25J 15/086 |
| | | | | 901/1 |
| 2016/0214715 | A1* | 7/2016 | Meffert | B64D 47/08 |
| 2018/0059676 | A1* | 3/2018 | Smith | G01B 11/14 |
| 2018/0191967 | A1* | 7/2018 | Kester | G01J 3/0229 |
| 2018/0266944 | A1* | 9/2018 | Waxman | G01F 1/76 |
| 2019/0064799 | A1* | 2/2019 | Amirloo Abolfathi | |
| | | | | G07C 5/0808 |
| 2020/0158592 | A1* | 5/2020 | Sivarkkamani | G01M 3/002 |

* cited by examiner

ROBOTIC SOURCE DETECTION DEVICE AND METHOD

FIELD OF THE INVENTION

The invention relates to detecting, locating and reporting gas leaks at industrial locations, and more particularly, to a device, system, and method for the detection and reporting of methane leaks at industrial locations such as oil and gas production wells, storage tanks, pipelines, and transport of oil and gas resources through pipe distribution networks.

BACKGROUND OF THE INVENTION

Methane gas is a pollutant that is attributed to global warming and other maladies. A significant percentage of methane gas emissions originate from oil and gas facilities. As a consequence of known methane gas emissions, regulatory requirements have increased thereby making productions in methane gas emissions important from not only a regulatory concern, but also as a general environmental concern.

One known method for detection of methane leaks is the use of infrared (IR) cameras that are used to generate images which can reveal sources of methane leaks. Because methane gas quickly distributes through the surrounding atmosphere, the mere presence of methane gas at an oil and gas facility does not pinpoint the location of the leak. In order to pinpoint methane leaks, attempts have been made to deploy stationary IR cameras at various locations within a site, but at a prohibitive cost because high-quality IR cameras are expensive. More recent attempts have been made to deploy IR cameras on a movable platform, such as an aerial vehicle.

One example of a US patent reference that discloses a remote system for gas leak detection is the U.S. Pat. No. 10,704,981. This reference teaches a scanning system for producing a concentration map of a leaking gas. A tunable light source is used to adjust its wavelength over the absorption band of the gas of interest. The system includes the tuned light source, a lightweight mirror to scan the light, a lightweight collection optic, an array of detectors to measure reflected light, one or more processors configured to align the scanning with the detected signal and analyze the signal to produce a path averaged concentration map of the leaking gas. The processors are configured to use an analytical model of plume dynamics to compare the detected concentration map and calculate leak location and rate. A flying unmanned vehicle can be used to carry sensors in order to detect and collect gas data to produce the concentration map.

Another reference that teaches the use of IR cameras on a mobile platform for detection of gas leaks is the U.S. Pat. No. 10,113,956. This references discloses a system to remotely detect gas leakage by use of a mobile platform that carries two light sources: a mid-infrared (mid-IR) laser for detecting absorbance of the gas in the area, and a visible laser for detecting a pathlength of the mid-IR laser. The absorption is determined based on the relative amplitude difference of the emitted and reflected mid-IR light beams. The mid-IR laser may use wavelength modulation techniques to improve the absorption determination. The pathlength is determined by comparing a phase between the emitted visible light beam and the measured visible light beam. The gas detection system calculates a concentration of the gas in the area using the determined absorption and pathlength. The mobile platform may be an unmanned aerial vehicle.

Yet another reference that teaches the use of IR cameras on a mobile platform for gas leak detection is the U.S. Pat. No. 6,7430,467. The invention disclosed in this reference is a vehicle mounted gas detector device comprising a laser transmitter and signal analyzer carried on the vehicle. The vehicle has a laser absorption cell mounted on the exterior of the vehicle, a light guide connecting light from the laser transmitter into the laser absorption cell, a photodetector mounted with the laser absorption cell exterior to the vehicle to convert light that has traversed the laser absorption cell into electrical signals, and a cable connecting the photodetector to the signal analyzer.

While the prior art may be adequate for its intended purposes, there is still a need to provide a reliable, autonomous gas detection device that is capable of being remotely operated to identify a pinpointed source of a leak, relay information regarding the leak to stakeholders, and being capable of remaining on station for an extended period.

SUMMARY OF THE INVENTION

According to a first preferred embodiment of the invention, it includes an autonomous robot device or vehicle capable of detecting, identifying, and locating the source of methane leaks. Because of the number of operating components within the device, it may also be considered a robotic system. The device comprises multiple components or subsystems that enable the device to be remotely operated and to move autonomously and safely within a location, to selectively deploy source detection components that can precisely locate the source of a leak, to relay data regarding the leak to stakeholders, and to remain powered that enables operation of the device over an extended period.

The robot device platform is a wheeled vehicle powered by electrical motors. The body of the device platform is used to mount all device components to include a drivetrain, mast, electronics, and navigation subsystems. The body is constructed of a robust material such as aluminum or other metal alloy that is capable of supporting the weight of all the other subsystems yet minimizes the weight of the device. This body is covered by panels that protect the internal components from external damage. The panels along with seals also provide waterproofing from weather such as rain and snow. The robotic vehicle is intended to be operated in all weather conditions including rain and snow. The panels may be constructed from a composite material that is lightweight yet with sufficient strength and resiliency to protect the interior components of the robotic vehicle.

According to one configuration, the robotic vehicle has four wheels each powered by an electric motor. The wheels may be pneumatic or airless tires. The inflation level or stiffness of the tires can be selected to provide a desired amount of suspension to allow the vehicle to travel on rough terrain. Each of the motors are mechanically coupled to the wheels using a corresponding gearbox that increases the torque of the motors while decreasing motor output speed. The gearboxes transmit driving power through 90° linkage to bearing-supported wheel driveshafts thereby allowing the motors to be packaged more compactly in the frame of the vehicle. Bearing assemblies are mechanically linked to the gearboxes for interconnecting the wheels to the gearboxes.

The drivetrain of the robotic vehicle is also equipped with a braking capability internal to each of the motors that provide a selective braking force on some or all of the wheels. The braking capability enables the robotic vehicle to slow itself down quickly or remain stationary on an incline while using minimal power.

The robotic vehicle is equipped with a source detection subsystem that can identify and quantify an item of interest to the user. Examples of items which may be sourced are gas leaks and other observable phenomena such as methane at an oil and gas well,), liquid leaks, sound/noise, light, and others. The source detection subsystem uses one or more sensors that measure the robot's surroundings and/or an optical sensor that scans the environment similar to a camera. To quantify and locate the source of a sound of interest, an omnidirectional microphone may be used to detect the sound, and a directional microphone utilized to determine the direction from which the sound originated. Liquid leaks may be detected using a combination of a visual camera (to visualize the liquid on a surface) and an infrared camera (to visualize the vapors evaporating from the liquid pool, if any); these sensors capture similar data in terms of a "picture/video" of the robots surroundings but are differentiated in the wavelengths of light which they can accurately detect and record. Light sources are detected and inspected using a visual camera alone. In the example of locating and quantifying a methane gas leak, an ambient air sensor is capable of measuring the methane concentration wherever the device is located at that moment. The optical sensor adds the capability to measure the methane concentration of the surroundings instead of measuring only the concentration at a single point. The robot includes a mechanism that points the sensor in a direction that the robotic vehicle specifies; any of the aforementioned sensor types may be mounted upon this pointing mechanism. The sensor pointing mechanism may include a pan/tilt mechanism, a gimbal, or any other device that can control sensor tilt and rotation via electrical signals.

The robotic vehicle of the invention manages sensor outputs that are combined with operational software to navigate the device to a location to identify the source of a leak. Two navigation modes work in tandem to complete the objective. In both modes, continuous gas measurements are recorded along with positions where the measurements were taken. As data is collected, it is fed as training data to a machine learning model of operation software, and the model then outputs gas concentration data and corresponding location data.

A mast is used to raise or lower the detection subsystem to a desired height. The mast is collapsible or extendible within a height range that is required for the particular installation where the robot is located. For example, the mast could be collapsible for locating the detection subsystem close the ground at a height of the upper surface of the robot. The mast could be extendible to a height in the range of 10-25 feet, which would likely accommodate most oil and gas platforms. The selective actuation of the mast provides another dimensional data point to precisely locate the source of a leak and provide information for quantification of the leak. Most oil and gas facilities have piping arrangements with pipes and storage units at various heights, and such pipes and storage units may be closely spaced from one another. Without providing height dimension data, the pinpointed location of the leak may not be determinable since there could be many pipes located within the same small area.

The electronic subsystem of the device comprises of all the electronics necessary to power, operate, and control the device. The robot is powered by rechargeable batteries. These batteries are connected to an electronics box that contains all of the necessary voltage convertors, motor drivers, capacitors, and other power electronics. The electronics box also houses an onboard central control computer that autonomously determines path planning for movement of the robot by inputs received from the navigation subsystem. Once a path is determined by the navigation subsystem, motor commands are relayed to the motor drivers from the control computer which propels the robot in whichever direction the computer determines the robot should go. This central computer acts as the central processing unit of the robot and is capable of sending commands to any other component that is electronically controlled including the mast, motors and navigation subsystem.

A navigation subsystem is used to control movement of the robotic vehicle by sending electronic navigation commands through the onboard computer to the drivetrain which in turn, controls each of the wheels. The navigation subsystem utilizes data from one or more sensors, which may comprise a single monocular camera, a stereoscopic camera, a lidar or a combination of the three. The monocular camera records single images, which are processed onboard the robot to extract depth and distance data from the image. The stereoscopic cameras are two identical cameras, operated in parallel to generate 3-dimensional imagery of the robot's environment. These cameras utilize an infrared (IR) projector to illuminate the robot's environment in the infrared spectrum, and the stereoscopic depth cameras record time-of-flight data for the IR beams as well as images in both the visible and IR spectra, providing another alternative for navigation sensing. A LIDAR (Light Detection and Ranging) sensor operates in a similar fashion, using collated light beams (laser beams) to measure the distance to objects in the robot's environment as the light beams are reflected off of the objects. Thus, the selective application or combination of the aforementioned sensors provides redundant environmental sensing data as inputs for the robot's navigation algorithms in a wide range of lighting and weather conditions.

The one or more cameras and/or lidar are mounted on the body of the robot to ensure that the robot can perform reliable and controlled movement. The navigation subsystem is capable of obstacle detection and avoidance, robotic path planning, and emergency stops of the robot. In addition to collection of visual and radar data, the robot is also equipped with an IMU (Inertial Measuring Unit) that provides robot position, orientation, velocity, and acceleration data to the onboard controller. The navigation subsystem and IMU work together to perform various SLAM (Simultaneous Location and Mapping) tasks and to ensure movement of the robot is accurate and consistent with the electronic subsystem's movement commands.

The onboard control computer receives and records data from the one or more sensors. The control computer has a processor that runs operational software that enables control of the robot by pre-programmed instructions of the software/firmware. One particular feature of the software/firmware is the machine learning program or algorithm of the navigation subsystem that continually updates instructions as to the particular path the robot should take to arrive at the location of the leak.

The robot has two primary modes of operation. The first mode is a search mode that is used as a means to direct the robot to the source of the leak. In the search mode, the robot uses an "objective map" for navigating the robot to the source of the leak. Logic in software or firmware of a central computer of the robotic vehicle utilizes one or more algorithms to set goals for the vehicle to deploy to maximum recorded measurement intensities, presumptively a potential source of a leak. Additional measurements are recorded and fed into the machine learning model of the central computer. An updated objective map is used to set a new goal positions. If the robotic vehicle finds a local maximum in intensity where measurement intensity drops in all directions and the source conditions have been met, a second exploration mode is triggered.

The exploration mode collects additional data to in key areas at the jobsite to build a more robust model. In the exploration mode, new goals are generated for areas with sparse, or no data, and the model prioritizes areas that characterize the mapping but do not point to a source, such as outliers, minima, asymptotes, eigenvectors, etc. The navigation subsystem handles path planning, obstacle avoidance, and motor control to move the robot to goal position for both exploration and search modes.

A docking station is provided to recharge the batteries of the robot. The docking station may be configured for wired or wireless charging. Accordingly, the robot also incorporates an electrical connection for wired charging and/or a receiver coil for wireless charging by inductive coupling. The docking station is where the robot will recharge and reside between site patrols.

The robotic vehicle is intended to be operated in a variety of locations where methane leaks or other sources of interest may be present. Many of these locations are related to oil and gas installations which could include production wells, storage tanks, pipelines, and urban pipe distribution networks.

The robotic vehicle is advantageous for replacing personnel used to patrol a site where a leak has occurred. The robot is capable of remaining on station for extended periods which therefore prevents having to deploy personnel to the site who may otherwise be required to intermittingly check for leaks, go into a situation with little to no knowledge on a leak, be in a hazardous environment for extended periods of time trying to pinpoint a leak. This manual effort by attending personnel can be time consuming, dangerous, and labor intensive.

The robotic vehicle is also advantageous for replacing and/or complimenting existing static detection systems. The robotic vehicle is mobile at the site location and also has a vertical detection capability which provides dimensional freedom to pinpoint and quantify a methane leak. Stationary sensors can only identify that a leak is occurring within a general area but such sensors are incapable of pinpointing the leak thus requiring subsequent manual searching and investigation.

In connection with the robotic vehicle of the invention, according to a first aspect of the invention, it may be considered as a robotic vehicle for detecting a source of a gas leak, comprising: a vehicle frame; electric drive motors mounted to the vehicle frame; wheels connected to drive shafts of the drive motors; motor controllers communicating with the drive motors to selectively control rotational movement of the wheels; an extendable and retractable mast assembly mounted to the frame, the mast assembly including a mast base and a mast; a gas detection sensor positioned at an upper end of the mast; a central computer secured within the vehicle for controlling autonomous operation of the vehicle, said central computer including at least one processor for executing programming tasks and at least one memory element for storing data; a first software application integral with said central computer for receiving data and for executing commands to control the vehicle through a processor of said central computer, said data including navigational data, sensor data, environmental data, and user defined data; and at least one navigational camera mounted to the vehicle for providing visual images of an environment in which the vehicle operates.

In connection with the robotic vehicle of the invention, according to a second more detailed aspect of the invention, it may be considered as a robotic vehicle for detecting a source of a gas leak, comprising: (a) a vehicle frame; (b) electric drive motors mounted to the vehicle frame; (c) wheels connected to drive shafts of the drive motors; (d) motor controllers communicating with the drive motors to selectively control rotational movement of the wheels; (e) an extendable and retractable mast assembly mounted to the frame, the mast assembly including a mast base and a mast; (f) a gas detection sensor positioned at an upper end of the mast; (g) a central computer secured within the vehicle for controlling autonomous operation of the vehicle, said central computer including at least one processor for executing programming tasks and at least one memory element for storing data; (h) a first software application integral with said central computer for receiving data and for executing commands to control the vehicle through a processor of said central computer, said data including navigational data, sensor data, environmental data, and user defined data; (i) an onboard gateway that communicates with an external network to facilitate flow of data between communication networks associated with the vehicle; (j) an RTK GPS unit communicating with the central computer to facilitate determining a location of the vehicle through a GPS link; (k) an IMU unit integral with the central computer to establish a spatial orientation of the vehicle during operation; (l) a GPU communicating with the central computer to manage graphics rendering tasks associated with display of selected data and visual images to a remote display device. More specifically, the GPU is used to accelerate mapping of the environment by generating and filtering terrain meshes from sensor data, training and executing neural models, and accelerating visual based navigation and (m) at least one navigational camera mounted to the vehicle for providing visual images of an environment in which the vehicle operates.

According to another aspect of the invention, it may be considered a system for detecting a source of a gas leak, comprising: a robotic vehicle for detecting a source of a gas leak, said robotic vehicle including: (a) an extendable and retractable mast assembly mounted to the robotic vehicle, the mast assembly including a mast base and a mast; (b) a gas detection sensor positioned at an upper end of the mast; (c) a central computer secured within the robotic vehicle for controlling autonomous operation of the vehicle, said central computer including at least one processor for executing programming tasks and at least one memory element for storing data; an external network gateway communicating with the central computer to facilitate flow of data between communication networks associated with the vehicle; a first software application integral with said central computer for receiving data and for executing commands to control the vehicle through a processor of said central computer, said data including navigational data, sensor data, environmental data, and user defined data;

an external network gateway communicating with the central computer to facilitate flow of data between one or more communication networks associated with the vehicle; a second software application communicating with said robotic vehicle to receive data, display data, and to selectively transfer data to one or more remote computing or communication devices within a communications network of said one more communication networks, said second software application comprising a plurality of user interfaces for displaying said data associated with operational functions of said robotic vehicle including recorded data for detected gas concentrations and locations where said gas concentrations were detected; and at least one of a mobile communication device or remote computer that runs said second software application wherein the remote display device is incorporated in said mobile communication device or remote computer and wherein at least one user interface is generated on the remote display device that displays said recorded data for detected gas concentrations and said locations where said gas concentrations were detected.

According to yet another aspect of the invention, it may be considered a method for detecting a source of a gas leak, comprising: providing a robotic vehicle including: an extendable and retractable mast assembly mounted to the robotic vehicle, a gas detection sensor positioned at an upper end of the mast, and a central computer secured within the robotic vehicle for controlling autonomous operation of the vehicle, said central computer including at least one processor for executing programming tasks and at least one memory element for storing data; positioning the robotic vehicle at a jobsite where a gas leak is suspected; generating commands for the robot to commence movement at the jobsite, said commands being processed by said central computer to actuate electric motors of said robotic to move said vehicle toward a detected leak, said commands being generated from a source detection algorithm based on a gradient descent model, wherein said commands continually refine a position of the robotic vehicle so that it moves to an area of high probability of increased gas concentration; predetermining a path of travel for said robotic vehicle based on initial gas concentrations detected by said gas detection sensor; moving said robotic vehicle along said predetermined path in a first search mode; selectively raising and lowering said mast assembly to obtain sensor readings at different heights as said robotic vehicle travels and when said robotic vehicle comes to a stop; determining, by said central computer, whether said sensor readings satisfy one or more conditions indicating a likelihood of a detected leak near or at a present location of the robotic vehicle where sensor readings are taken; determining, by said central computer, when said conditions are satisfied to then operate said robotic vehicle in an exploration mode; operating said vehicle in said exploration mode to determine when goal conditions are met, said goal conditions defined as data recorded in an area where said gradient descent model indicates the presence of a higher concentration of gas; and confirming the source of the leak is found by iterative executions of said gradient descent model that are stable.

Other features and advantages of the invention will become apparent considering the following detailed description taken in conjunction with an evaluation of the figures herein.

BRIEF DESCRIPTION OF THE DRAWINGS

FIG. 11 also represents an exemplary computer processing and communication network that may be used in connection with the robotic vehicles and existing on-site sensors that are installed at a jobsite of interest.

DETAILED DESCRIPTION

According to one aspect of the invention the invention it can be considered an autonomous robotic vehicle capable of detecting, identifying, and locating vaporized methane leaks. These leaks can occur at a variety of locations including oil and gas production wells, storage tanks, pipelines, and urban distribution pipes. The robotic vehicle includes various components that enable the robotic vehicle to drive autonomously and safely, deploy one or more gas detection devices, identify the source of a leak, relay information to an operator, and recharge batteries for autonomous operation over an extended period.

Figure 1:
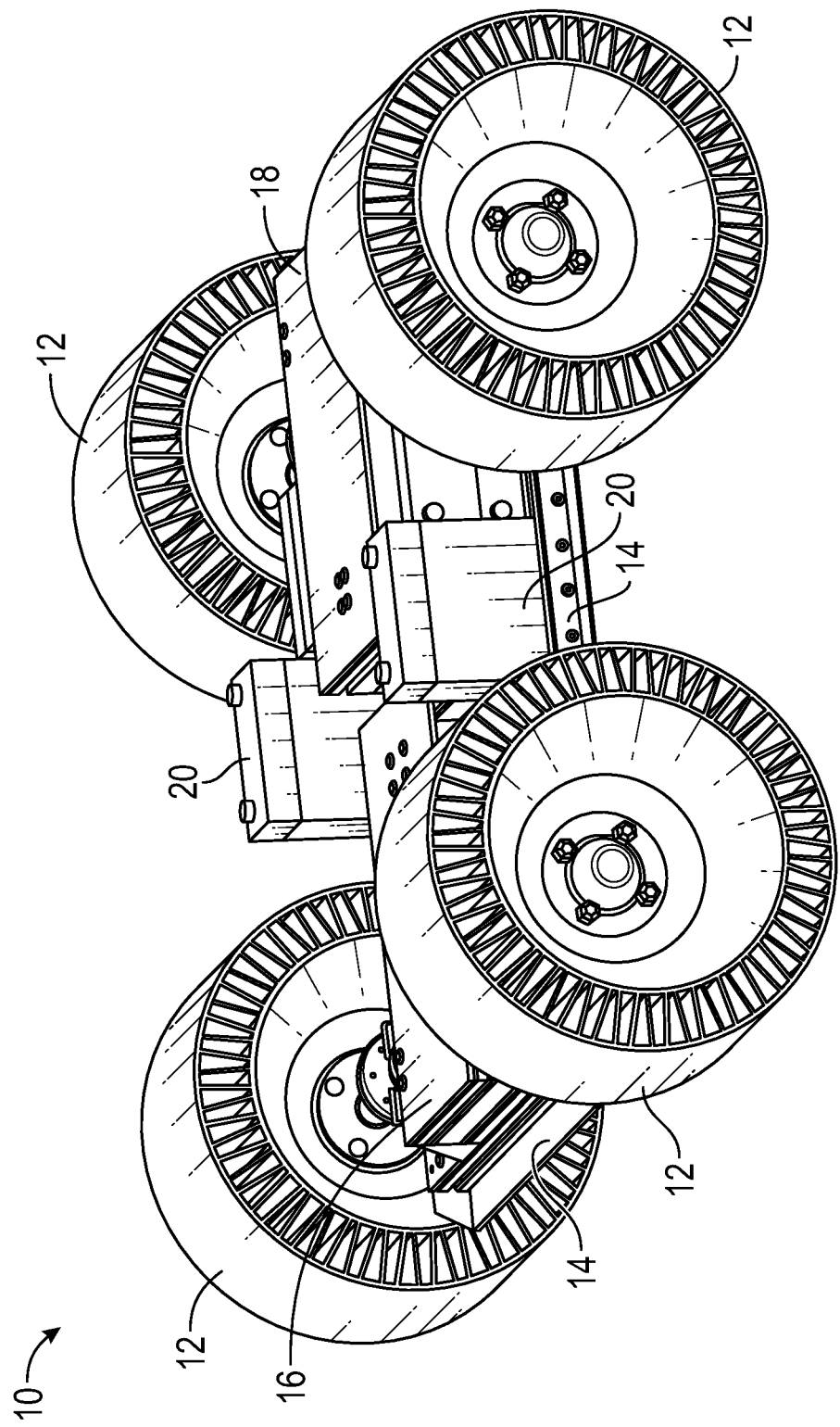
FIG. 1 is a perspective view of the carriage or frame of the autonomous vehicle device or robot according to a first embodiment of the invention.

FIG. 1 is a perspective view of the carriage or frame of the autonomous vehicle device or robot according to a first embodiment of the invention. The device 10 has four wheels that support a main frame or carriage 14. The main frame 14 may be constructed of lightweight metal components such as aluminum. The main frame 14 serves as the support structure for which all components of the robotic vehicle are mounted. A mast platform 16 is secured to one side or end of the main frame 14. The mast platform 16 is used as the base for mounting the extendable and retractable mast. The other side or end of the frame 14 includes an electronics platform 18 that is used as a platform for mounting various electronic components. Two primary batteries 20 are shown and mounted on opposite sides of the main frame 14.

Figure 2:
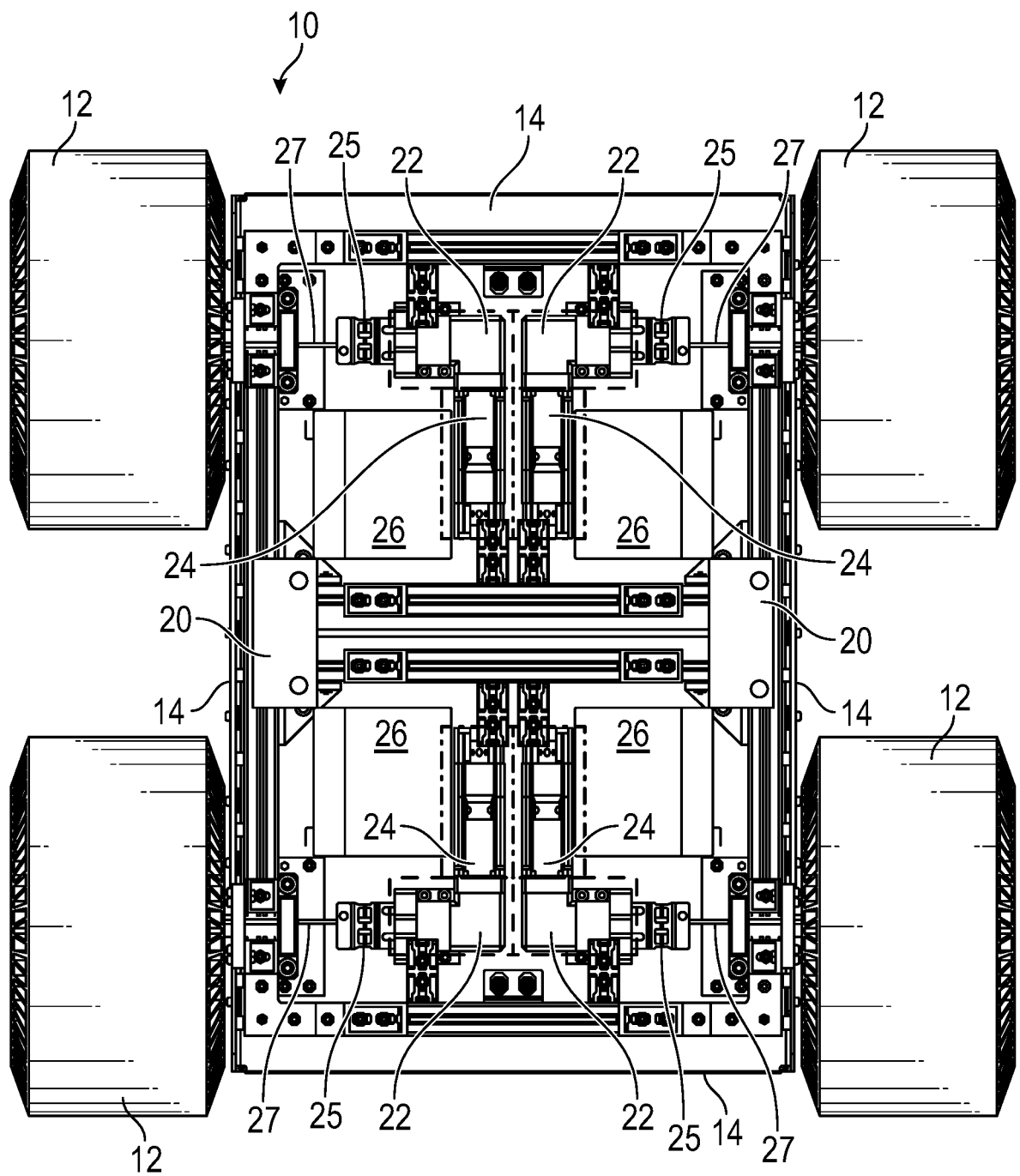
FIG. 2 is a top plan view of FIG. 1 with some components removed to view details of a powertrain of the device.

FIG. 2 shows a top plan view of FIG. 1 with some components removed to view details of a powertrain of the device. Four gearboxes 22 are provided to transmit rotational power to the wheels 12. Each wheel has its own corresponding gearbox: therefore, each of the wheels 12 can be independently driven in order to maximize mobility and control of the robotic vehicle. Bearing assemblies 25 are located between the gearboxes 22 and the wheels 12 to mechanically link the gearboxes for controlling power applied to the wheels. Drive axles 27 are shown as extending from the bearing assemblies 25 to the wheels. The robotic vehicle is steered whereby differentially driving or braking wheels on one side of the robot cause the robot to turn towards the side that is away from the driven side. Thus, no steering gear is required and the robotic vehicle can perform 360° point turns in-place. If airless tires are used, then no additional suspension is required to drive the vehicle over rough or uneven terrain. The airless tires provide sufficient shock absorption and wear characteristics to survive for the life of the robotic vehicle.

The robotic vehicle includes supplemental or secondary batteries 26. Four secondary batteries 26 are illustrated, it being understood however that the vehicle can adopt any number of batteries to provide adequate battery backup power as may be required by assigned missions to be undertaken at a jobsite.

Figure 3:
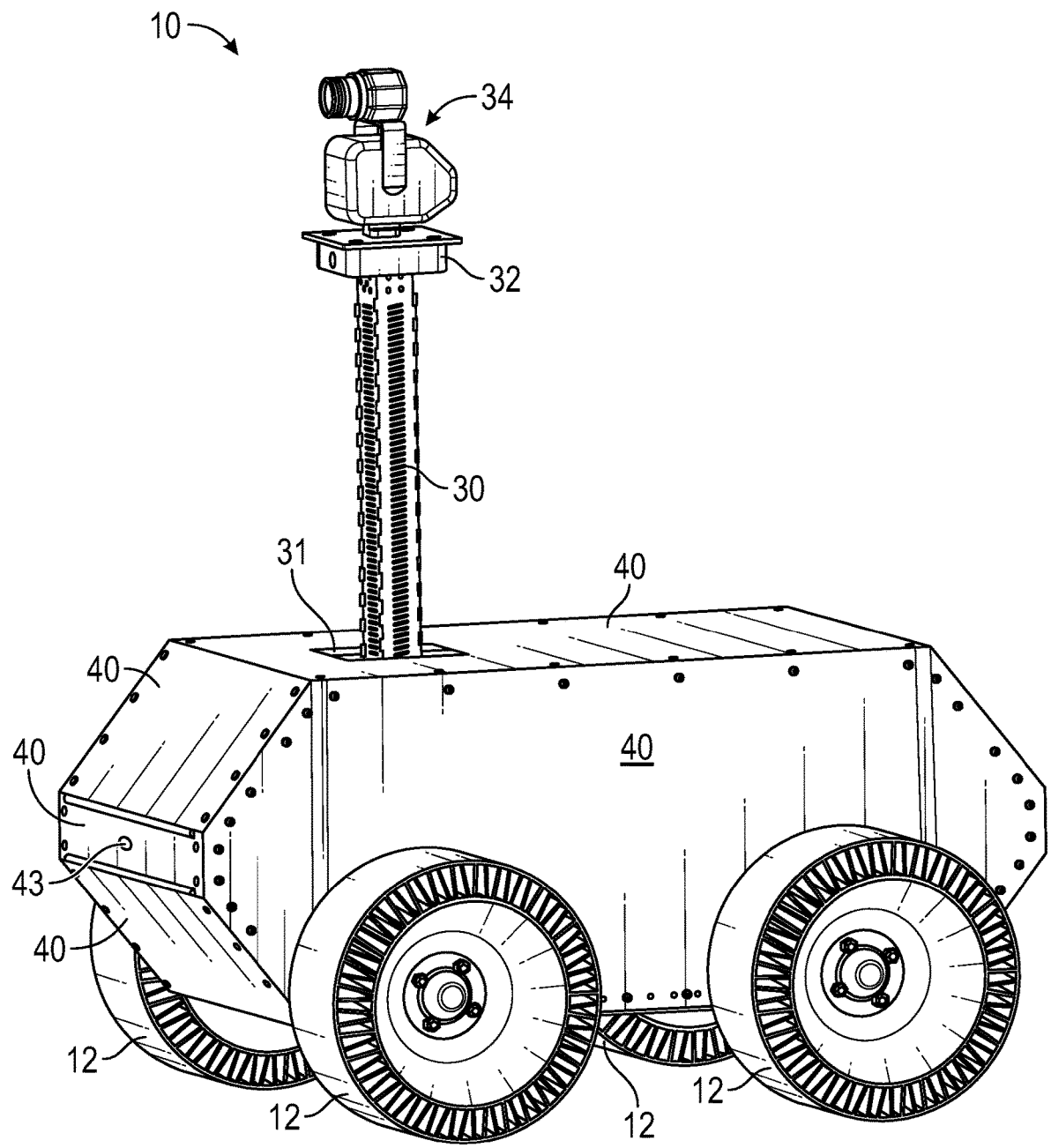
FIG. 3 is a perspective view of the device with exterior panels attached, the mast partially raised and a sensing device mounted to the mast.

FIG. 3 is a perspective view of the device 10 with exterior panels attached, the mast partially raised and a sensing device mounted to the upper end of the mast. More specifically, the vehicle 10 is illustrated with a plurality of exterior panels 40 which house the internal components of the robotic vehicle. The panels are sized and configured so that the robotic vehicle maintains a relatively low and compact profile which enables it to be maneuvered in tight spaces. Each of the panels 40 may be bolted to an underlying panel frame (not shown) which is secured to the main frame or carriage 14.

A mast 30 extends through an opening 31 in the upper surface panel 40. The mast 30 is extendable and retractable to selectively place one or more sensors at a desired height for gas measurement. The upper end of the mast 30 incorporates a mast sensor mounting plate or platform 32 for mounting the one or more sensors. The sensor 34 depicted in FIG. 3 can therefore represent any type of sensor that is especially adapted for locating and monitoring a gas leak, noting the particular sensor illustrated resembles an optical sensing device. The mast is preferably extendible to heights between about ten to twenty-five feet that enables the robotic vehicle to effectively scan oil and gas facilities along an entire vertical profile of the facilities. The mast is collapsible during travel to place the mounted sensors close to the upper surface of the vehicle to prevent the vehicle from tipping over while driving or operating in high winds. Preferably, the mast has a payload capacity of at least 1 kilogram to raise and lower mounted sensors within a reasonable amount of time, such as a 1-2-minute timeframe.

FIG. 3 also illustrates a sensor 43 that could be any one of an optical camera, an infrared camera, a directional or omnidirectional microphone, or combinations thereof. As shown, the sensor 43 is mounted in a front panel of the robotic vehicle. However, a plurality of sensors can be mounted on any surface of the panels 40 and therefore, according to another preferred embodiment of the invention, it may include one or more sensors mounted to any selected surface of the robotic vehicle. As mentioned, selected sensor(s) can be used for navigational aid (e.g., optical cameras), vaporized gas detection (e.g., infrared cameras), sound detection (directional or omni directional microphones), or liquid leak detection (combination of optical cameras and infrared cameras).

In one specific embodiment, the sensor 43 may depict a navigation camera that is a very small forward-facing visible light camera, located in the front panel as shown. The navigational camera is used to provide supplementary visible light imagery data to the navigation subsystem. Data recorded from the navigational camera is augmented by data from source detection sensors (e.g., an IR camera, LIDAR, etc.) The body of the navigational camera is a small box housed inside of the robot and behind the front panel. The navigational camera records images and video data through a small lens looking out through a lens aperture in the front of the robot, concealed behind a transparent panel.

Figure 4:
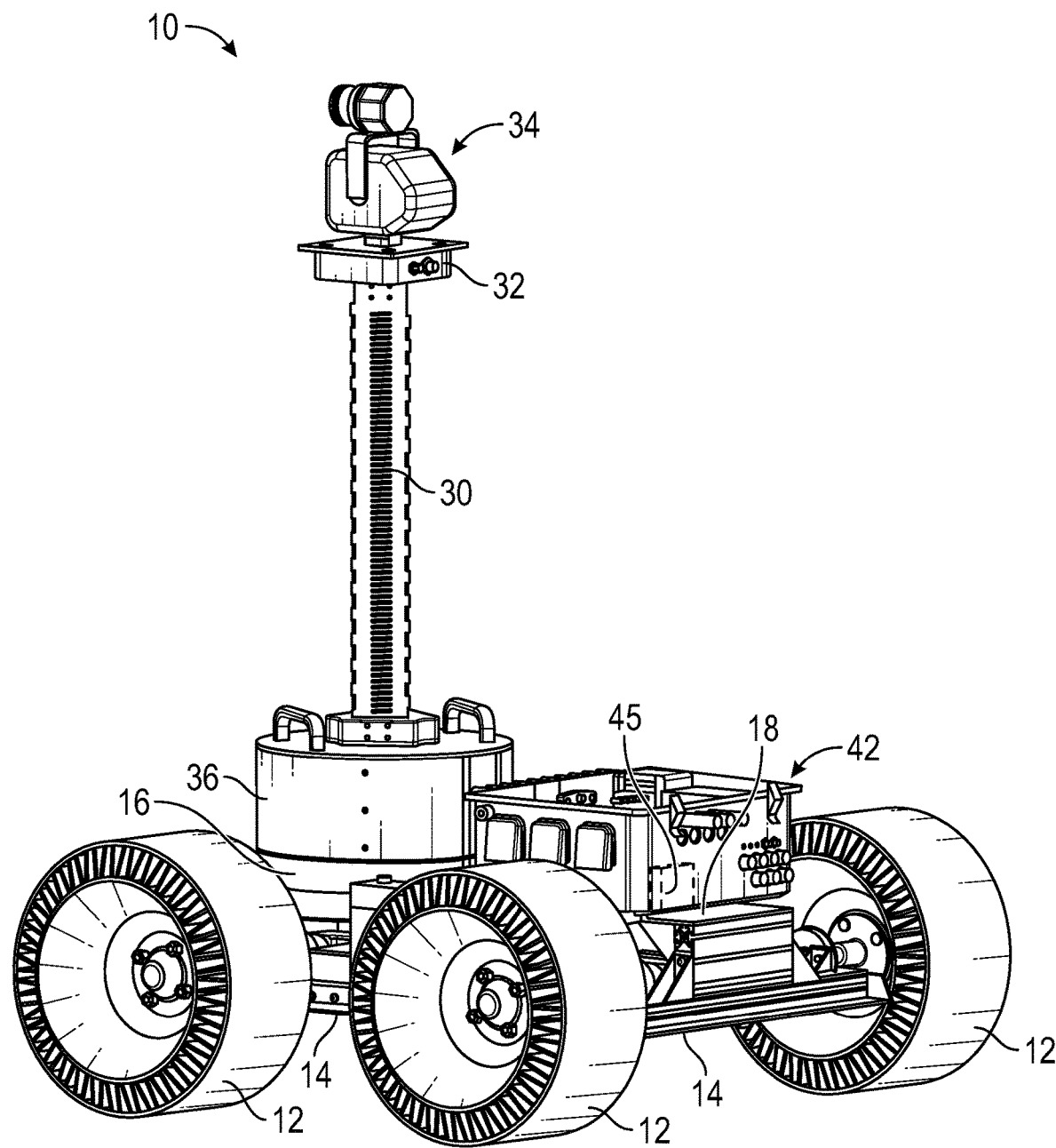
FIG. 4 is another perspective view of the device with the exterior panels removed and showing the partially raised mast with the mounted sensing device.

FIG. 4 is another perspective view of the device 10 with the exterior panels 40 removed and showing the partially raised mast 30 with the mounted sensor 34. A mast housing 36 is secured to the mast platform 16 for supporting the extendable/retractable mast 30. One example of a mast device that may be used is disclosed in the U.S. Pat. No. 9,267,640, this reference being incorporated by reference herein for the purpose of disclosing the particular structure for the extendable and retractable mast 30. In summary, this reference teaches a mast configuration with three flexible bands that forms respective sides of the mast. The flexible bands are stored in the mast housing 36. The flexible bands are wound around three corresponding spools (not shown) spaced at 120° from one another. When the spools are un-wound the bands are pushed towards one another causing the edges of each band to contact the edges of the other two bands. Teeth located on the edges of the bands interlock with one another forming a stable triangular structure in cross-section. The height of the mast is adjusted by unwinding/rewinding the spools holding the bands. FIG. 4 also shows a housing 42 for the robot's main computer. This housing is a weatherproof box with sealed input/output cable glands, as well as air inlets and outlets to allow an ambient air sensor 45 mounted within the housing 42 to measure the atmosphere surrounding the robot.

If the mast device disclosed in the '640 patent is used, the operation of the mast 30 is as follows: when a command is sent from the operator to the on-board computer of the vehicle, a mast motor inside of the mast housing 36 turns a leadscrew (not shown), which in turn unrolls the three spools holding the coiled flexible bands. The ability to store the flexible bands in a rolled configuration on the spools allows the mast to be stored in a compact arrangement with a ratio of stowed/deployed height of at least 1:10. In addition, the mast cannot retract without commanding the motor to turn the leadscrew and reels. Therefore, the mast remains in a locked position when deployed at any height along its deployment. The mast requires the same amount of power to deploy and retract, has a sizeable payload capacity at the end of the mast, and can be operated in either a vertical or horizontal configuration. The sensor platform 32 at the top of the mast allows a variety of means for interfacing with sensors and actuators, including electrically, mechanically, and communications interfacing (RS 232, CAN Bus, etc.).

Figure 5:
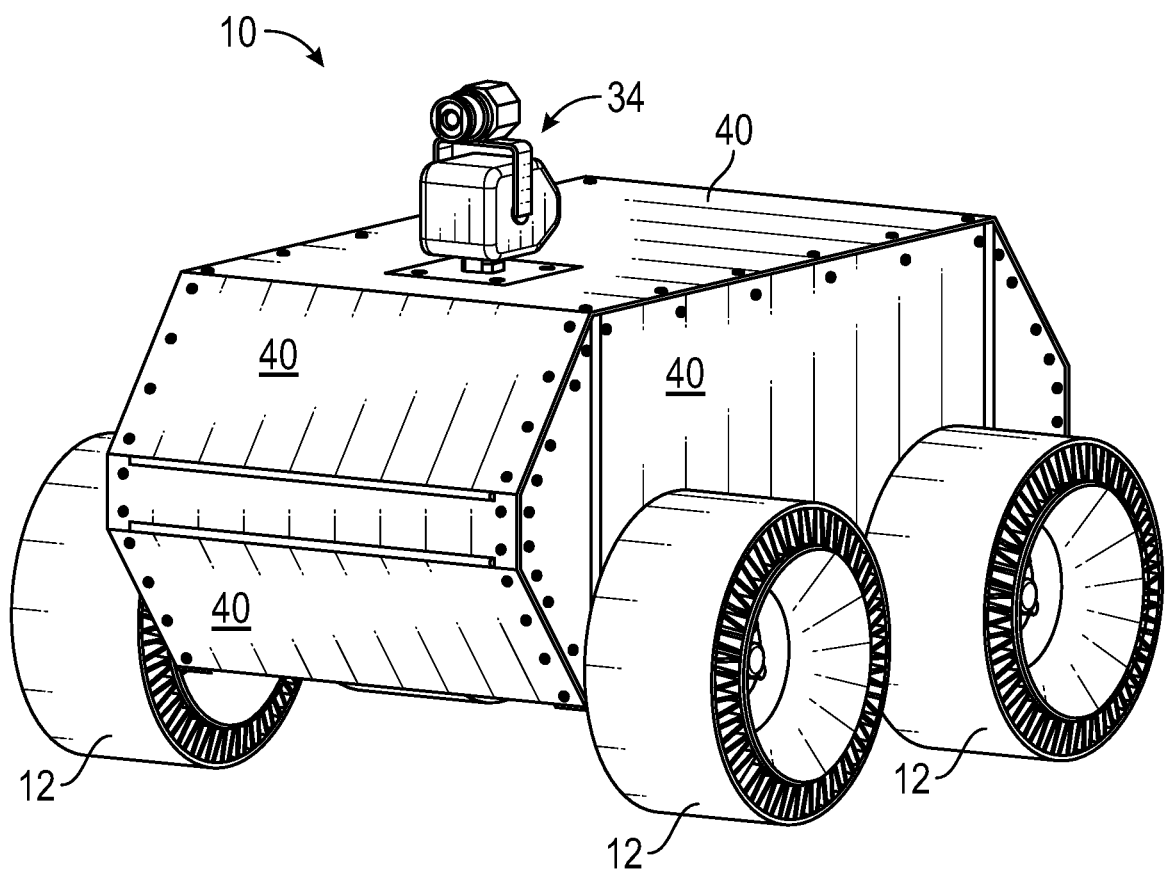
FIG. 5 is a perspective view of the device with the exterior panels attached and the mast retracted.

FIG. 5 is a perspective view of the device with the exterior panels 40 attached and the mast 30 retracted. From this view, one can appreciate the compact profile of the robotic device that enables it to travel on a stable platform because the mast 30 is fully stowed within the vehicle and therefore does not add any vertical height to the vehicle.

Figure 6:
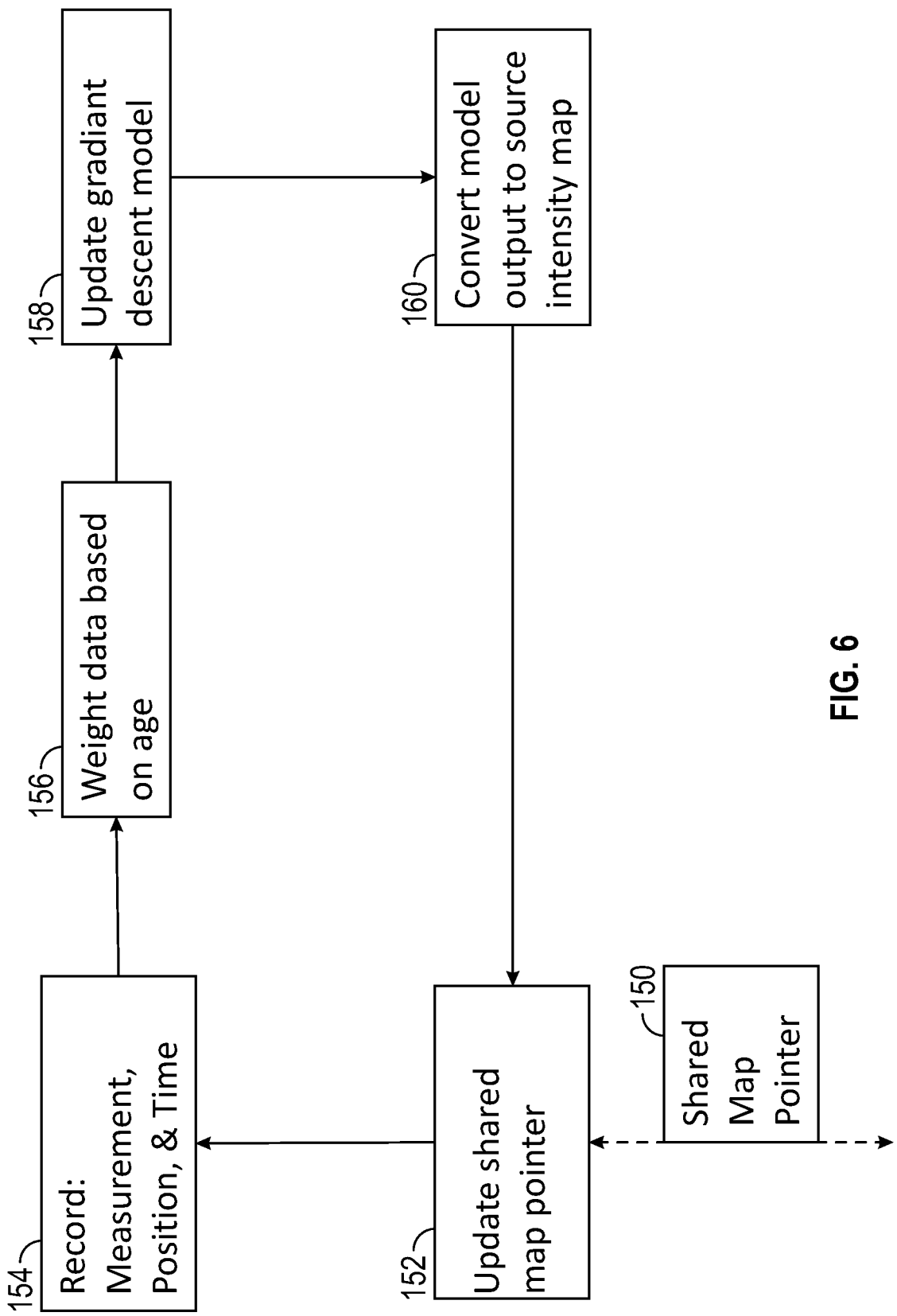
FIG. 6 is a flowchart depicting methodology associated with collection and utilization of data which enables the robotic vehicle to locate the source of a leak most efficiently.

FIG. 6 is a flowchart depicting methodology associated with collection and utilization of data which enables the robotic vehicle to efficiently locate the source of a leak. The flowchart generally represents computational steps associated with utilization of the data within a gradient descent model in which the probability of finding a leak is represented as a map showing gas concentration or intensity. Gradient descent in mathematics is a first-order iterative optimization algorithm used to find a local minimum of a differentiable function. The algorithm is executed in repeated steps in the opposite direction of the gradient (or approximate gradient) of the function at the current point, as this is the direction of steepest descent. The local and global minima of the surface represent areas of high gas concentration (such as methane). Instructions from the central computer of the robotic device focus on continually refining the position of the robotic vehicle so that it moves to an area of high probability of increased gas concentration on the surface. When determining which direction to drive the robotic vehicle to get closer to a leak, a source detection algorithm seeks to advance the gradient descent as quickly as possible. The data used in the source detection algorithm that is incorporated within the gradient descent model includes collected atmospheric data of gas concentration at the job site. In the context of the exploration mode of operation versus the search mode of operation, the gradient descent model is executed within the search mode while the exploration mode is more of a data collection operation in which the probability surface of the gradient descent model cannot be utilized until there is a threshold amount of data collected.

At step 150, this is the starting point in which data is retrieved from point or points represented on the virtual map of the model surface. At step 152, the shared map pointer references data is taken in and updated to make sure that the data corresponds to the same place (referring to the same, shared data). At step 154, the robotic vehicle is driven around the jobsite and data is recorded including measurements of gas concentration, corresponding locations and times. At step 156, the collected data is then weighted based on how much time has elapsed since the data was collected (the age of the data). At step 158, the gradient descent model is updated with the weighted data and the model at step 160 then generates an updated source intensity map which depicts the most relevant data pointing to the specific location of a leak. Steps 152-160 are repeated until the model becomes stable which is signified by reduced changes in the generated source intensity map.

Figure 7:
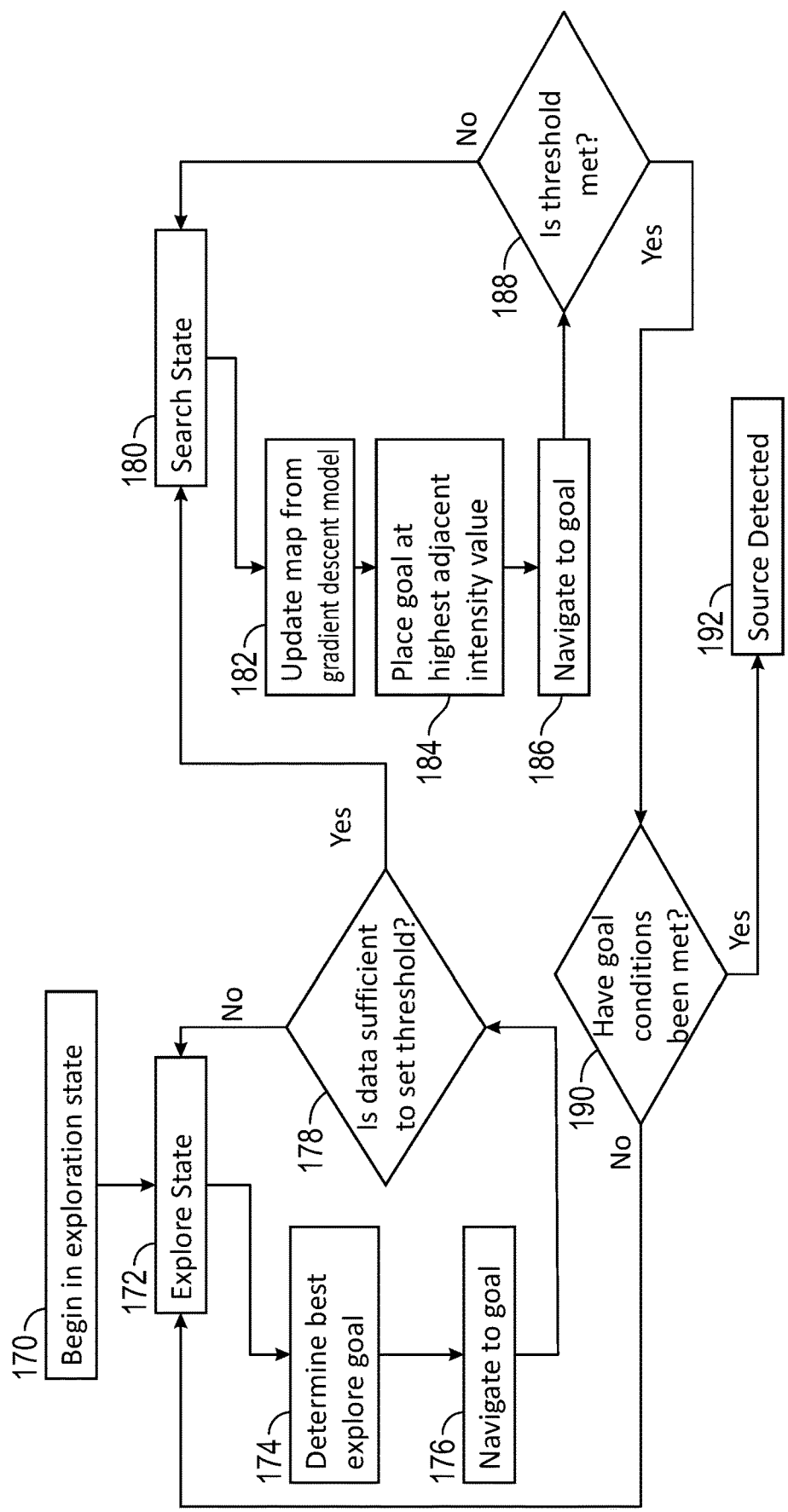
FIG. 7 is a flowchart depicting methodology associated with the exploration mode of operation of the robotic vehicle.

FIG. 7 is a flowchart depicting methodology associated with the exploration mode of operation of the robotic vehicle. The end point or goal of the methodology shown in this figure is to achieve model stability and thereby presumptively detecting a source of a leak. At step 170, the exploration mode or state is commenced. At step 172 the state is explored, meaning initial data is evaluated. At step 174, a determination is made as to the best goal possible considering the attendant circumstances regarding the quantity and quality of data that can be obtained. At step 176 the robotic vehicle is navigated to the goal. At step 178, a determination is made whether there is sufficient data to satisfy a threshold value according to the gradient descent model. In other words, is there sufficient data to set a threshold as reflected in model stability in which the model has converged on a certain result or threshold value, namely, a maxima indicated by the highest detected concentration of gas. If the model has not yet converged on a maxima, then the data is not sufficient to set the threshold. Accordingly, if there is no convergence on a maxima, the process is repeated again at step 172. If the data is sufficient to set the threshold, then the robotic vehicle then operates in the search mode or state as indicated at step 180. At step 182, the concentration map is updated from the calculations made in the gradient descent model of FIG. 6. At step 184, the goal, i.e., the location of the leak, is placed at the highest adjacent intensity value meaning the highest concentration or intensity of the gas leak is the presumptive goal. At step 186, the robotic vehicle is driven to the goal. When arriving at the goal a determination is made at step 188 as to whether the threshold is met. If the threshold has not been met, then the search process is repeated by returning to step 180. If the threshold is met, then a determination was made at step 190 whether goal conditions have been met. A goal is a location of interest at the site. The goal, for example, can either be an area where data has not yet been recorded or an area where the gradient descent model indicates the presence of a higher/highest concentration of gas. A determination of when goal conditions are met is defined as an area where data has been recorded and an area where the model indicates the presence of the higher/highest concentration of gas. A determination of when goal conditions are not met is when data has not been recorded yet at the area or when the model indicates a higher concentration of gas at another area. If goal conditions are not met, then the process is repeated beginning at step 172. FIG. 7 therefore represents an iterative process to detect the source of the leak in which the model utilized is continually validated to ensure there is enough recorded data in the model concentration predictions as well as confirmation that threshold and goal conditions are met.

In summary for FIG. 7, this figure represents logic associated with the determination of the location lately in which sufficient data gathered results in model stability. It threshold value or maxima of the detected gas is indicated when the model converges on a value or range of values. Exploration is continued until the model was stabilized and the threshold value is reached. Threshold considerations include the requirement to drive the robotic vehicle around the jobsite until the model was stabilized as indicated by reaching the threshold value. The robotic vehicle continually explores the jobsite to get updated gas concentration data and then the algorithm of the model searches within that concentration data to find the next most likely location to find the source of the leak. If the source is not found, i.e., when the predicted gas concentration does not match the sensor data, then the operation of the vehicle is then reverted back to the exploration mode or state in which the robotic vehicle continues to search for another location of high gas concentration. Placing the goal at the highest adjacent intensity means a location for the robotic vehicle to drive to as determined by the highest gas concentration indicated by the gradient descent model values at that time. The model will predict where the location of the next highest gas concentration is located based upon the observed current location of the robotic vehicle. Commands are generated and executed by the central computer of the vehicle to drive the vehicle towards the next highest gas concentration location. In other words, the gradient descent model predicts the next location adjacent to the robot where a higher gas concentration value is located. If the prediction is incorrect and the measured gas concentration is not as high as indicated by the model, the robot will switch back to the exploration mode. Instructions for navigating the robotic vehicle are always directed to where the model predicts the location of the maxima. If the predicted maxima and the observed or recorded concentration do not match, the robotic vehicle will be directed somewhere else and will keep collecting data. Instructions from the central computer direct the robotic vehicle to move to a random second location away from the previously visited location.

A summary of the operation of the robotic vehicle follows: When commanded by an operator, the robotic vehicle leaves the docking/charging station (not shown) and begins its patrol on the jobsite seeking a source of leaking gas. The vehicle preferably has airless tires and the electric motors powered by the onboard batteries. The motors are controlled via the central onboard computer that receives data inputs from the sensors on the vehicle and existing sensors at the jobsite, if any are installed at the jobsite. This data enables the computer to plan a navigation path and send drive commands to the motors. The vehicle travels in a patrol area at the jobsite and the methane source detection sensor(s) continually scan the area for methane in the local atmosphere. This detection sensor(s) are mounted to the extendable mast that raises the detection sensor(s) vertically at various points throughout the patrol. While driving, the mast is retracted. If a methane leak is suspected or detected above the ground surface, the mast is extended to the appropriate height to inspect the potential source of the leak. This vertical extension capability enables the robotic vehicle to accurately quantify a methane leak high above the ground. Following a patrol, the mast is retracted and the vehicle is commanded to navigate back to its docking/charging station for battery recharge and to await a next site patrol.

The robotic vehicle is equipped with a source detection components that can identify and quantify a methane leak in an open outdoor atmosphere from significant distances. The source detection function of the robotic vehicle may utilize one or more sensors that measure the concentration of methane or another pollutant such as particulate matter. The depicted sensor 34 may be an optical sensor that provides the capability for measuring gas concentration of the surrounding atmosphere within its field of view. An ambient air sensor may also be used to measure the methane gas concentration wherever the robotic vehicle is located at that moment. If an optical gas sensor/camera is utilized, the vehicle is outfitted with a mechanism that can point the camera in a direction that the operator specifies. The pointing mechanism can be the pan/tilt mechanism, gimbal, or any other device that can control camera tilt and rotation via electronic commands.

The sensor data that is recorded is combined with autonomous navigation software that facilitates efficiently driving the vehicle to the source of the leak. As the vehicle travels, new sensor data is continually taken to pinpoint the source and quantify the magnitude of the leak. As mentioned, two navigation modes work in tandem to facilitate finding a leak; the search mode and exploration mode. In both modes, continuous gas concentration measurements are recorded along with the location where the measurements were taken. As data is collected, it is used to populate data variables in the machine learning model that creates a virtual map of gas concentration over a pre-defined area in a geographic location such as an oil and gas facility. In the search mode, the virtual map is used to navigate the vehicle to the source of the leak.

Figure 8:
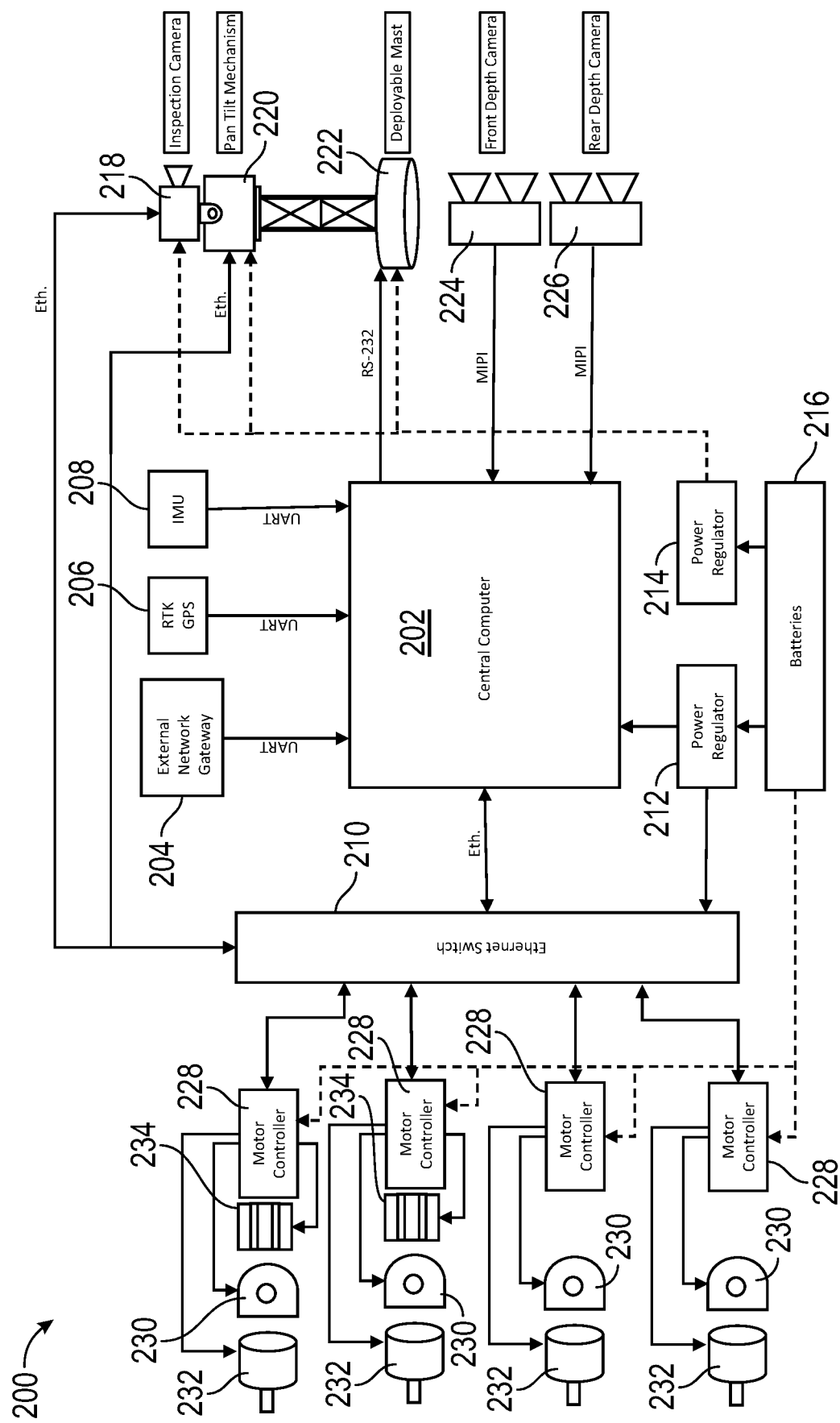
FIG. 8 is a schematic diagram illustrating mechanical and electronic components of the robotic vehicle.

FIG. 8 is a schematic diagram illustrating mechanical and electronic components of the robotic vehicle that may be considered a subsystem 200 of the robotic vehicle 10. The subsystem 200 comprises the onboard central computer 202 that controls all functions of the robotic vehicle enabling it to operate autonomously without manual intervention. The onboard computer controls other functions of the robotic vehicle to include operation of the mast, methane sensor(s), ambient air sensor(s), optical camera controls such as gimbal and pan-tilt devices, and processing of camera images and video.

An external network Gateway 204 communicates with the central computer 202 through a universal asynchronous receiver/transmitter unit (UART). A UART as understood by those skilled in the art is not a communications protocol but rather a physical circuit in a microcontroller or standalone integrated circuit. The present invention, a UART connection provides a more reliable means of connection between the external network Gateway 204 and the central computer 202. The external network gateway 204 may be embodied in networking hardware or software to enable flow data between networks. In general, the external network gateway 204 represents a generic means of interoperability or interface between communication networks in which the robotic vehicle operates. The gateway 204 could be any type of wireless connection protocol such as an LTE, Wi-Fi and/or Bluetooth. A real-time kinematic global positioning system (RTK GPS) unit 206 of the invention also communicates with the central computer 202 by UART. The RTK GPS unit 206 enables the robotic vehicle to determine its present position by use of a GPS reference point and an onboard state estimation filter. In this regard, the invention is therefore connected to a GPS network in which all movements of the robotic vehicle may be tracked and recorded. An inertial measurement unit (IMU) as discussed collects acceleration, linear movement, and rotational data of the robotic vehicle to establish the current orientation of the robot which also influences the positioning of the robot. An ethernet switch 210 manages the ethernet connections to various components of the vehicle to include the motor controllers 228 and connections to/from a methane inspection sensor/camera 218. According to one preferred embodiment, the methane inspection sensor/camera 218 may also be represented by the camera 34 illustrated in FIGS. 3-5.

One or more power or voltage regulators are provided to ensure provision of steady and constant voltage supplies through all operational conditions. The power regulators handle voltage spike suppression in the event of sudden shutdown or excess power drawn during by a drive motor during a wheel stall event. In the figure, two power regulators 212 and 214 are illustrated, the regulator 212 managing power to the central computer 202 and to the motor controllers 228 while the other power regulator 214 manages power to the inspection camera 218, a pan/tilt mechanism 220 and the deployable mast 222. Power is served directly from the batteries to the motor controllers 228 as shown.

Front and rear navigation cameras 224 and 226 may be mounted to the robotic vehicle on the front and rear sides of the vehicle to assist in vehicle navigation. The video images taken are processed through the central computer 202 for many purposes to include obstacle avoidance and to allow an operator to view the present position of the vehicle as it is driven around the job site.

Four motor controllers 228 are illustrated, each motor controller being used for rotational control of a corresponding drive motor 232 for each wheel 12. Each drive motor 232 is paired with a quadrature encoder 230 and brushless motor driver (not shown). The encoder 232 is preferably a rotary encoder that provides a closed loop feedback signals by tracking the speed and/or position of the drive motor shaft. The encoder can provide information about change in position, absolute position, and speed of the motor shaft. The signals are used by the central computer to make decisions about motor operation parameters. The combination of the encoder and motor drive enables traction control and assists in tracking the robotic vehicle's movements and speed. Two of the motors 232 are equipped with heavy duty brakes 234. The brakes 234 reduce power consumption while the vehicle is stationary and decrease the time required to stop the vehicle. One type of brake that can be used is an electromechanical disk brake operated by electrical actuation. When power is applied to a coil of an electromagnet of the brake, the magnetic flux attracts an armature to a face of the brake resulting in frictional contact between inner and outer friction disks. The brakes are configured to fail safe so when the vehicle is powered down, it will remain stationary and not pose a risk to nearby people, vehicles, and infrastructure. Each motor controller 234 utilizes a Modbus TCP over ethernet connection to communicate with the central computer 202.

According to one preferred embodiment, the vehicle is equipped with the methane detection sensor/camera 218 and an Internet protocol (IP) enabled pan tilt mechanism 220, both utilizing an ethernet connection with the central computer 202. Preferably, all of the ethernet connections are fed into an industrial ethernet switch (not shown) that are then routed to the central computer 202 that manages all of the Internet Protocol (IP) connections. The central computer 202 also functions as a domain name system (DNS) server for connection of the various components of the vehicle that may require connection to the Internet, such as the sensor/camera 218 and pan/tilt mechanism 220.

The navigation and control electronics of the robotic vehicle handle all functions required to power, operate, and control the vehicle. The central computer autonomously determines path planning by taking input from the navigation components. Once a path is planned, motor commands are relayed to the motor drivers that power the motors 232 to propel the robotic vehicle along the pre-planned path. The navigation and control electronics In the preferred embodiment of FIGS. 3-5, the deployable mast 222 corresponds to the mast 30. The deployable mast 222 is managed directly from the central computer 202, such as by RS-232 serial commands. As needed, the central computer will issue serial commands to raise the mast to a specific height at a desired rate. The central computer can also monitor mast status information such as the current height or power draw of the mast.

To perform localization and autonomous functioning, the robotic vehicle utilizes the RTK GPS 206, IMU 208, and the front and rear depth cameras 224/226. As mentioned, the GPS and IMU each use UART to communicate telemetry data to the central computer. The central computer may include a dedicated navigation stack for navigation control deployed on the Central Computer. This is then complimented with depth data from each of the depth cameras over MIPI.

To communicate with external networks as mentioned, the central computer 202 is linked to the external network gateway 204 over UART. Communications for the robotic vehicle are intended to be flexible for various communication modules, such as LTE or Wi-Fi. Over UART the gateway 204 transmits and forwards data over a TCP connection (not shown) to the central computer, allowing for rover telemetry and data streams to be sent to a remote command center and commands to be sent to the robotic vehicle from the remote command center.

Figure 9:
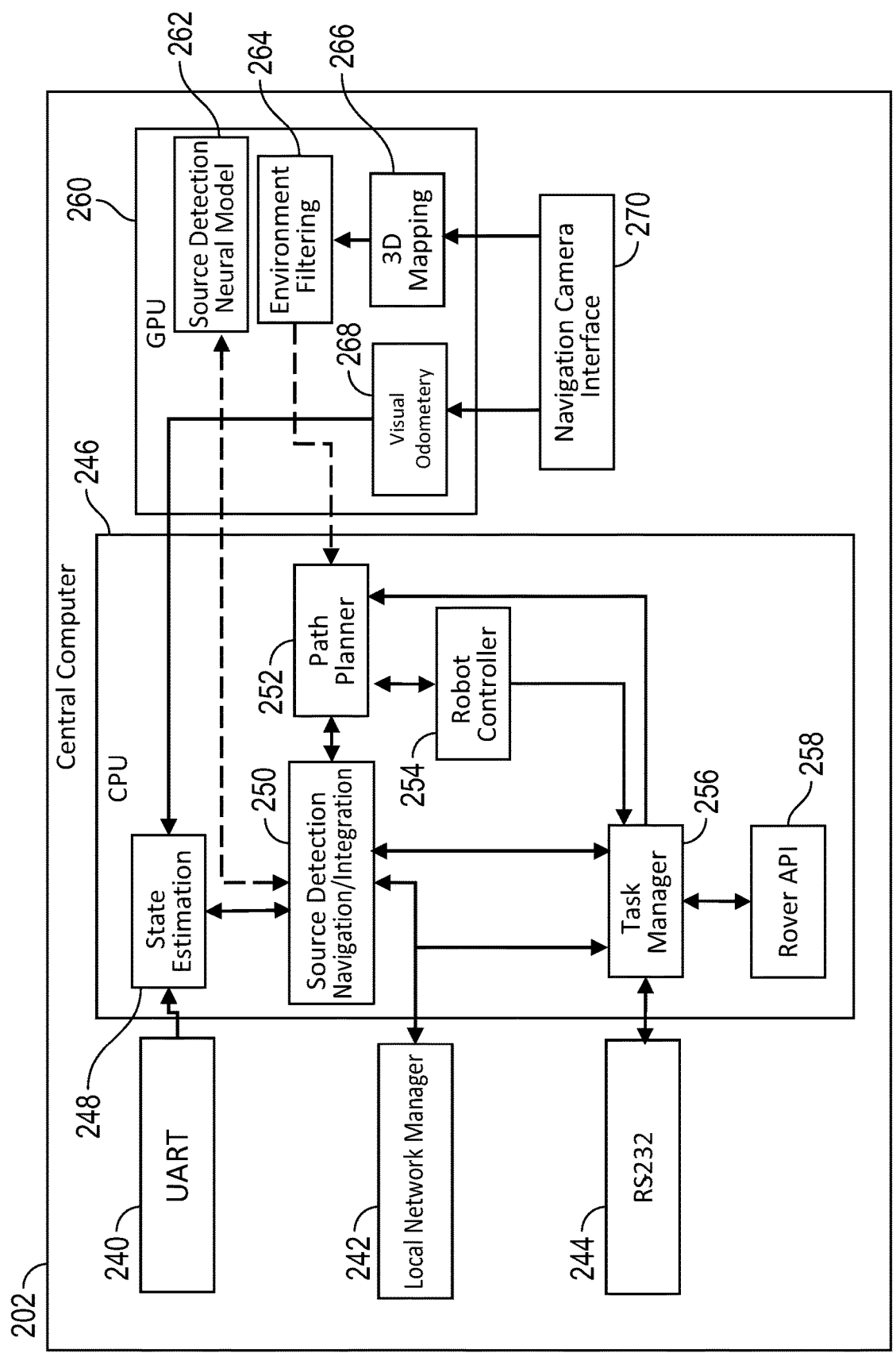
FIG. 9 is a schematic diagram illustrating components of the central computer of the robotic device.

FIG. 9 is a schematic diagram illustrating functional components of the central computer 202 of the robotic vehicle used to control vehicle navigation and other functions. UART 240 indicates how the central computer 202 communicates with various components of the subsystem 200 as described for FIG. 8 including the external network gateway 204, the RTK GPS 206, and the IMU 208. The local network manager 242 represents a control module used to manage a local area network (LAN) for communications between components of the vehicle and with any remote sensors that may be installed at the jobsite. The RS 232 element 244 represents the communications connection between vehicle components and the central computer such as a RS 232 connection with the deployable mast 34/222. The central processing unit 246 of the central computer handles a number of functions including state estimation 248 that comprises an extended Kalman filter used to fuse the data from different sensor sources to create the most accurate prediction of where the vehicle is located and how it is moving. A Kalman filter is a type of linear quadratic estimation algorithm uses a series of measurements observed over time, containing statistical noise and other inaccuracies, and produces estimates of unknown variables that are typically more accurate than those based on a single measurement alone, by estimating a joint probability distribution over the variables for each timeframe. Source detection navigation/integration 250 refers to an algorithm used for locating and pinpointing the source of a gas leak, the method of operation utilizing the algorithm being described in FIG. 10. The path planner 252 represents the logic associated with defining the robotic vehicle's path in a three-dimensional environment. The robot controller 254 refers to a control module that is used to parse computer coded path instructions and translating them to commands that can be used by the motor controllers. The task manager 256 represents programming associated with interfaces with external hardware and transmitting of data for commanding actuators and other mechanical components of the robotic vehicle. The rover API 258 is the vehicle side interface for transmitting and receiving compressed data to/from the central computer, necessary for command and control of the vehicle. The graphics processing unit (GPU) 260 represents a separate processor that is specifically designed to handle graphics rendering tasks including acceleration of mapping, navigation, and localization tasks.

The GPU 260 is therefore intended to represent an integrated electronic circuit that can quickly manipulate and alter memory to accelerate the creation of images in a frame buffer for output to a display device. The source detection neural model 262 represents a GPU-accelerated source detection model. The term "neural" refers to a model that it is trainable using sensor data on gas quantification. The environment filtering 264 represents processing of the three-dimensional (3D) map using the GPU 260. 3D mapping 266 represents linking 3D perception data (point cloud) into a 3D mesh that can then be interpreted by the environmental filters. Visual odometry 268 represents logic associate with utilizing the navigation/depth cameras 224 and 226 (e.g., a front navigational camera 43 shown in FIG. 3 which may also correspond to depth cameras 224 and 226) to track the vehicle's position in space and how far the vehicle has traveled. The navigation camera interface 270 represents the API utilized for processing and controlling the navigation cameras 224 and 226.

The sensors mounted on the vehicle along with pre-installed site sensors (if any exist) receive environmental data and convey the data to a memory component of the computer. Navigation is achieved by combined visual and inertia monitoring components that include an optical device and an Inertial Measuring Unit (IMU). The optical device may be a single monocular camera, depth camera, lidar, or a combination of the three. The IMU provides angular rate, linear acceleration, and angular orientation to the control system. The IMU can be a modular unit that performs all of the tasks of a conventional IMU by use of various accelerometers and gyroscopes. The optical devices and IMU work together to perform simultaneous location and mapping (SLAM) tasks. Movement of the vehicle by an operator is accurate and consistent with control signals generated by the computer in response to operator commands. Navigation of the robotic vehicle enables obstacle detection and avoidance; path planning and emergency stops.

The graphics processing unit (GPU) 260 uses accelerated programs to enable autonomous navigation and operation of the vehicle in real time. As understood by those skilled in the art, a graphics processing unit is a specialized electronic circuit designed to rapidly manipulate and alter memory to accelerate the processing of large data sets in array formats not limited to graphical image data but rather any operations requiring processing on array-based data such as point clouds and meshes. To execute autonomy, the robotic vehicle utilizes depth data from the depth cameras to map its current environment. This data is fed into two parallel systems running on the GPU, the visual odometry system and a three-dimensional navigation stack. By running complex navigation tasks on the GPU, the robotic vehicle can operate in near real time and quickly respond to its environment. The parallel running systems enable control of the vehicle much safer and stable when deployed in dynamic environments because the vehicle can quickly observe, process, and react to changing conditions at much higher rates than the same system running on only the CPU. In addition, the GPU also supports the deployment of various neural networks and models. The robotic vehicle's source detection capabilities are therefore enhanced because the large amounts of navigation data can be processed more rapidly.

The CPU of the central computer handles a management stack and system control software. A "stack" as used herein means an array or list structure of function calls and parameters used in the control software programming and CPU architecture. The management stack controls various interfaces used to control the vehicle, such as a local network manager that interfaces with the motors, inspection camera, and pan tilt unit. The management stack also includes the vehicle side application programming interface (API) that interprets and translates commands and data to and from the external network gateway. Vehicle commands are executed by the task manager. The task manager is responsible for producing commands to control the vehicle's various mechanical actuators such as the motors and mast. The CPU is also responsible for managing and executing source detection data collection and generating associated navigation commands.

Figure 10:
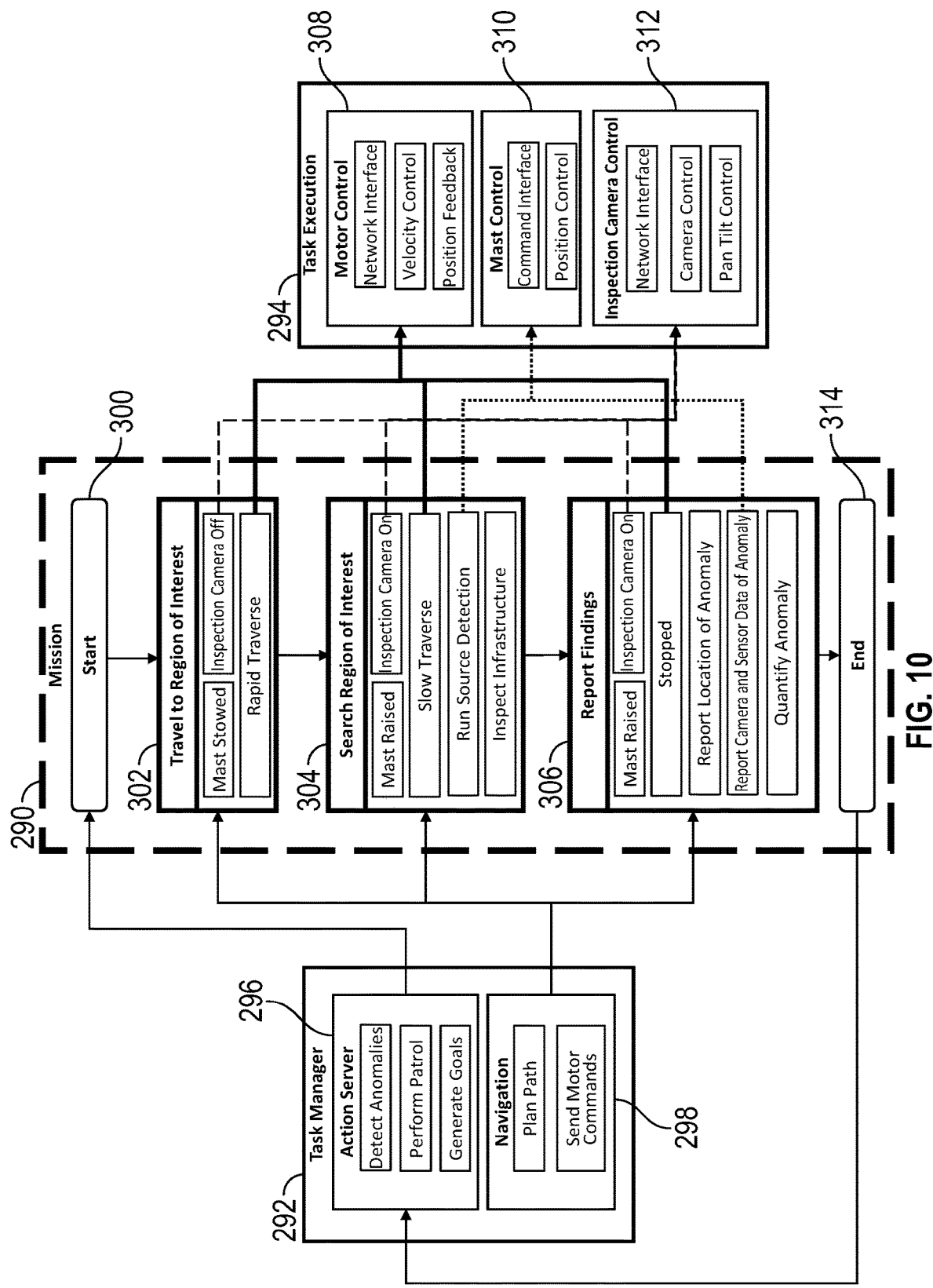
FIG. 10 is a schematic diagram illustrating operation of the robotic vehicle with reference to an example mission plan and specifically summarizing mission steps, task manager functions, and executed tasks.

FIG. 10 is a schematic diagram illustrating operation of the robotic vehicle with reference to an example mission plan and specifically summarizing mission steps, task manager functions, and executed tasks. To enable autonomous source detection by the robotic vehicle, the central computer utilizes dynamic state programming and execution. Dynamic state control can be conceptually separated in three functional areas: a task manager 292, a mission plan 292, and task execution 294. The task manager 292 produces high level goals for the vehicle based on commands received from the remote command center or commands triggered by a sensor reading. Mission goals are produced by the task manager and then dictate the mission profile that the robotic vehicle executes. Within the task manager 292, two primary functions are achieved, one by action server 296 and the other by navigation 298. Specific action server actions could include detection of anomalies, performing patrols, and generating robotic vehicle goals. Specific navigation actions shown in the figure include path planning and motor commands. An example mission plan 290 is also shown in FIG. 10. The start 300 of the mission commences when the robotic vehicle receives a command to pinpoint a leak within a certain region of interest. Once a mission has been defined, the robotic vehicle travels to the region of interest at step 302. During travel, the mast is stowed, the methane inspection camera(s) is off, and the motor controllers are commanded to move the vehicle in rapid traverse. At step 304, a search is conducted of the targeted region. During the search, the mast may be selectively raised, the inspection camera(s) are turned on, the vehicle may travel at a slow traverse, source detection tasks are executed, and cameras are used to inspect the infrastructure seeking the source of the leak. At step 306, findings are reported regarding the search efforts at 304. During this stage of the mission, the mast may still be raised, the inspection camera(s) may be on, and the vehicle is stopped. There was a vehicle reports the location of the gas concentration anomaly and reports specific camera and sensor data collected at the location of the anomaly. The anomaly may be quantified. To execute the mission the task execution function 294 parses path and goal data from the task manager and converts them to explicit motor commands. Similarly, while a source detection mission is active, the task execution function relays commands to the inspection camera's pan tilt unit and mast to perform inspection tasks. The task execution function 294 in this figure is subdivided into three categories; motor control 308, mast control 310, and inspection camera control 312. Under motor control 308, three subfunctions are listed including network interface, velocity control, and position feedback. Under mast control 310, subfunctions listed include command interface and position control. Under inspection camera control 312, three subfunctions are listed including network interface, camera control, and pan tilt control.

Figure 11:
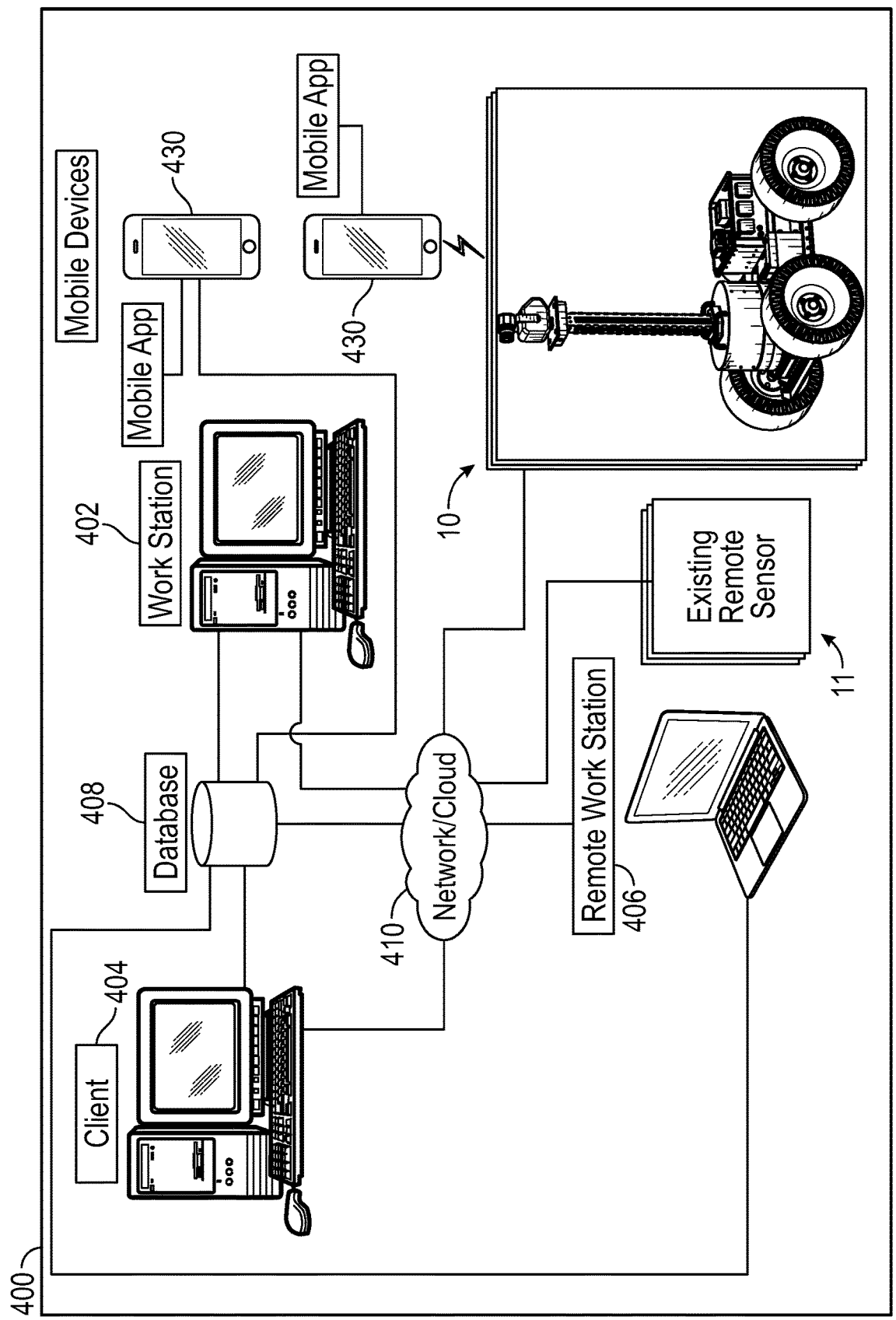
FIG. 11 is a schematic diagram showing one or more robotic vehicles and one or more existing sensors employed within a communications network or system.
Figure 14:
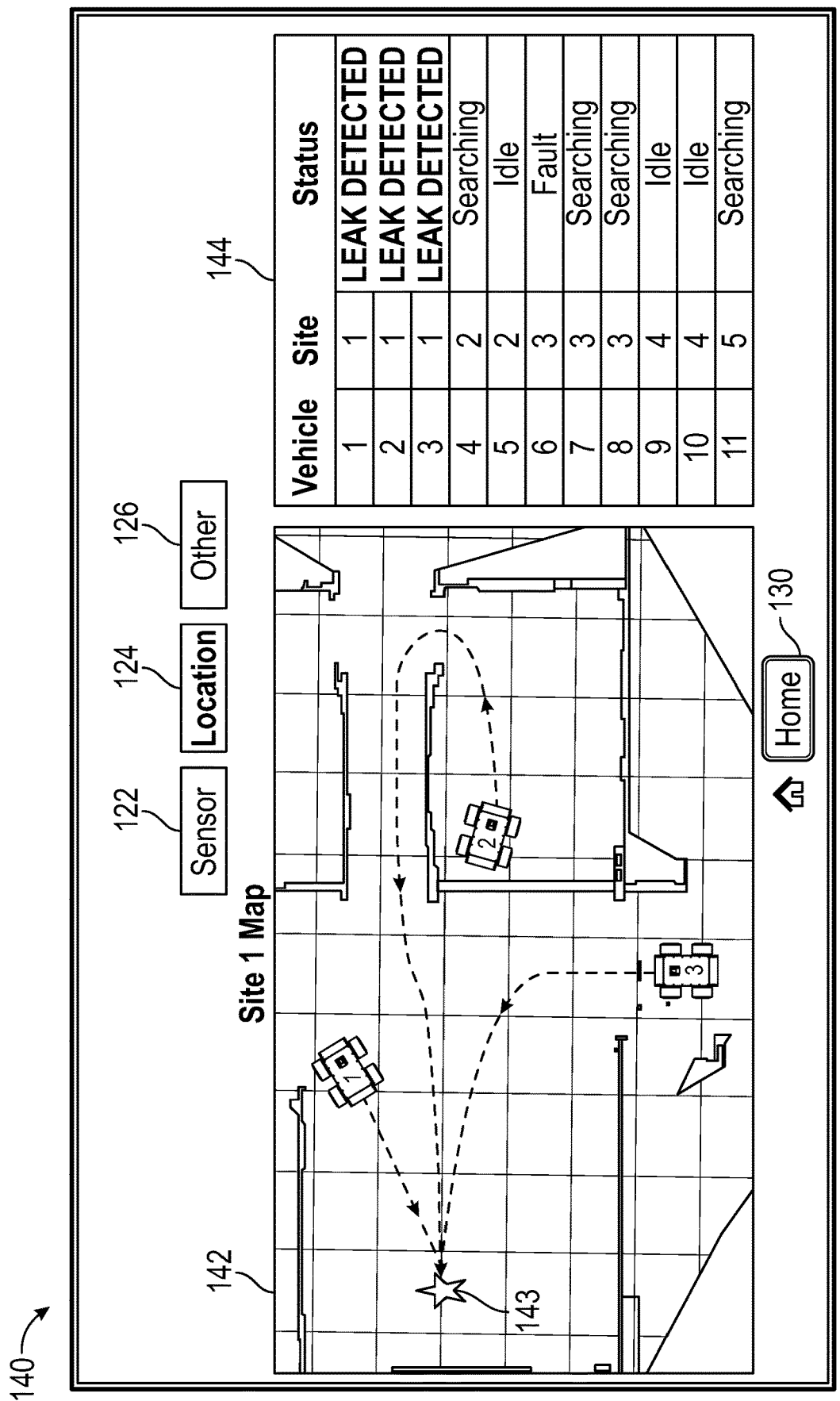
FIG. 14 is another sample user interface showing a virtual map of the current location of a robot at a job site and paths of travel taken to locate the source of a leak.

FIG. 11 is a schematic diagram of a system 400 of the invention. The system 400 defines an exemplary computer processing and communication network that may be used in connection with the robotic devices 10. More specifically, FIG. 14 illustrates a schematic diagram of the system that includes one or more user computers shown as workstation 402, remote workstation 406, and a client/customer computer 404. Each of the depicted computers 402, 404 and 406 may alternatively comprise more than one computer.

FIG. 11 also schematically illustrates a plurality of robotic devices 10 that may be deployed at one or more jobsites. Each of the devices 10 have its own wireless transmitter/receiver that is capable of wireless communications with one or more mobile communication devices 430. Alternatively, the workstations 402 and 406 could incorporate wireless communication capabilities so that wireless communications take place between one or more workstations and the mobile devices 430.

Each of the mobile communication devices 430 incorporate their own mobile application or "app" to process data received from the devices 10 and to generate user options for a user of the app. The communication devices 430 communicate with a communications network 410 such as by a web interface. The network 410 may also represent a cloud provider who facilitates communication with any or all communication endpoints shown in the system 400. The mobile devices 430 may also communicate with any other of the computers in the system through the network 410.

A plurality of existing remote sensors 11 may be installed at jobsite locations that are targeted for service by the robotic vehicles. In the instances where the jobsites already have such existing remote sensors, the likelihood is that these are stationary sensors that are monitored as part of operational control of the jobsite. Oil and gas facilities may already have a number of installed sensors for methane leak detection. According to another aspect of the invention, it is contemplated that the system 400 can receive and process data from the sensors 11 in order to enhance operational control of the robotic vehicles when employed at the jobsites. For example, sensors 11 may report on elevated methane levels at general location(s) within an oil and gas facility and this initial data can be used to help navigate the robotic vehicles in their early stages of travel during the exploration state.

The mobile devices 430 have their own internal computer processing capabilities with integral computer processors and other supporting hardware and software. The mobile devices may be specially configured to run mobile software applications in order to view user interfaces and to view and update system data. All of the functionality associated with the system as applied to the computers 402, 404, and 406 may be incorporated in the mobile devices 430 as modified by mobile software applications especially adapted for the mobile device hardware and operating systems. In connection with operating systems, it should therefore be understood that the mobile devices 430 are not limited to any particular operating system, Apple iOS and Android-based systems being but two examples.

Although FIG. 11 illustrates the use of workstations 402, 406, a client computer 404 and mobile communication devices 430, a simplified communications network according to another preferred embodiment of the invention only includes mobile communication devices 430 for monitoring and control of one or more of the robotic devices 10. In recent years, mobile apps have become a cost effective and efficient way for providing remote control of complex mechanical/electrical systems. All of the functionality associated with installation of the device(s), operation, troubleshooting and alarm management may be handled through a mobile app installed on mobile communication devices.

The workstation computer 402 represents one or more computers used at the jobsite to monitor the devices 10 and to generate user interfaces for a user to view and control device operation. The remote workstation computer 406 represents one or more computers used to remotely monitor the devices 10 and to generate user interfaces, thus having the same functionality as workstation 402 but the computer 406 being located remote from the jobsite. The client/customer computer 404 represents one or more computers of third parties, such as clients, who may wish to view operation of the device view the status of any leaks detected, and to generate correspondence with system users to instruct desired actions to be taken in connection with detected leaks. The client/customer computer 404 has limited system functionality in that it cannot be used to generate operation commands for control of the device, this functionality being reserved for authorized system users such as general contractors or building owner representatives.

The user computers 402, 404, and 406 may comprise general purpose personal computers (including, merely by way of example, personal computers and/or laptop computers running various versions of Microsoft's Windows® and/or Apple® operating systems) and/or workstation computers running any of a variety of commercially-available LINUX®, UNIX® or LINUX®-like operating systems. These user computers 402, 404, and 4s06 may also have any of a variety of applications, including for example, database client and/or server applications, and web browser applications. Alternatively, the user computers 402, 404, and 406 may be any other electronic device, such as a thin-client computer, Internet-enabled mobile telephone, and/or personal digital assistant, capable of communicating via a network and/or displaying and navigating web pages or other types of electronic documents.

The system network 410 may be any type of network familiar to those skilled in the art that can support data communications using any of a variety of commercially-available protocols, including without limitation TCP/IP, SNA, IPX, AppleTalk®, and the like. Merely by way of example, the communications network 410 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The workstation computer 402 may alternatively represent a server computer. One type of server may include a web server used to process requests for web pages or other electronic documents from the mobile devices 430 and computers 404 and 406. The web server can be running an operating system including any of those discussed above, as well as any commercially-available server operating systems. The web server can also run a variety of server applications, including HTTP servers, FTP servers, CGI servers, database servers, Java servers, and the like. In some instances, the web server may publish operations available as one or more web services.

The system 400 may also include one or more file and/or application servers, which can, in addition to an operating system, include one or more applications accessible by a client running on one or more of the user computers mobile devices 430 and computers 402 and 406. The file/application server(s) may be one or more general purpose computers capable of executing programs or scripts in response to the mobile devices 430 and user computers 402 and 406. As one example, the server may execute one or more web applications. The web application may be implemented as one or more scripts or programs written in any programming language, such as Java®, C, C#™ or C++, and/or any scripting language, such as Perl, Python, or TCL, as well as combinations of any programming/scripting languages. The application server(s) may also include database servers, including without limitation those commercially available from Oracle®, Microsoft, Sybase®, IBM® and the like, which can process requests from database clients running on a user computer.

The system 400 may also include a database 408 for storing all data associated with running the apps from mobile devices 430 and running any other computer programs associated with user interfaces provided to a user regarding the functions relating to operation and control of the device 10. The database 408, although shown being co-located with the workstation 402, may reside in a variety of different locations. By way of example, database 408 may reside on a storage medium local to (and/or resident in) one or more of the computers 402 and 406. Alternatively, it may be remote from any or all of the computers 402 and 406 and network 410, and in communication (e.g., via the network 410) with one or more of these. In a particular set of embodiments, the database 408 may reside in a storage-area network ("SAN"). Similarly, any necessary files for performing the functions attributed to the mobile devices 430 and computers 402, 404, and network 410 may be stored locally on the respective mobile device or computer and/or remotely, as appropriate. The database 408 may be a relational database, such as Oracle® database.

In accordance with any of the computers 402, 404, and 406, and also including the central computer 202, these may be generally described as general-purpose computers with elements that cooperate to achieve multiple functions normally associated with general purpose computers. For example, the hardware elements may include one or more central processing units (CPUs) for processing data. The computers 402, 404, and 406 may further include one or more input devices (e.g., a mouse, a keyboard, etc.); and one or more output devices (e.g., a display device, a printer, etc.). The computers may also include one or more storage devices. By way of example, storage device(s) may be disk drives, optical storage devices, solid-state storage device such as a random-access memory ("RAM") and/or a read-only memory ("ROM"), which can be programmable, flash-updateable and/or the like.

Further, each of the computers and servers described herein may include a computer-readable storage media reader; a communications peripheral (e.g., a modem, a network card (wireless or wired), an infra-red communication device, etc.); working memory, which may include RAM and ROM devices as described above. The server may also include a processing acceleration unit, which can include a DSP, a special-purpose processor and/or the like.

The computer-readable storage media reader can further be connected to a computer-readable storage medium, together (and, optionally, in combination with storage device(s)) comprehensively representing remote, local, fixed, and/or removable storage devices plus storage media for temporarily and/or more permanently containing computer-readable information. The computers and serve permit data to be exchanged with the network 410 and/or any other computer, server, or mobile device.

The computers also comprise various software elements and an operating system and/or other programmable code such as program code implementing a web service connector or components of a web service connector. It should be appreciated that alternate embodiments of a computer may have numerous variations from that described above. For example, customized hardware might also be used and/or particular elements might be implemented in hardware, software (including portable software, such as applets), or both. Further, connection to other computing devices such as network input/output devices may be employed.

It should also be appreciated that the methods described herein may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, ROMs, RAMs, EPROMs, EEPROMs, magnetic or optical cards, flash memory, or other types of machine-readable mediums suitable for storing electronic instructions. Alternatively, the methods may be performed by a combination of hardware and software.

The term "software" as used herein shall be broadly interpreted to include all information processed by a computer processor, a microcontroller, or processed by related computer executed programs communicating with the software. Software therefore includes computer programs, libraries, and related non-executable data, such as online documentation or digital media. Executable code makes up definable parts of the software and is embodied in machine language instructions readable by a corresponding data processor such as a central processing unit of the computer. The software may be written in any known programming language in which a selected programming language is translated to machine language by a compile, interpreter or assembler element of the associated computer.

Figure 12:
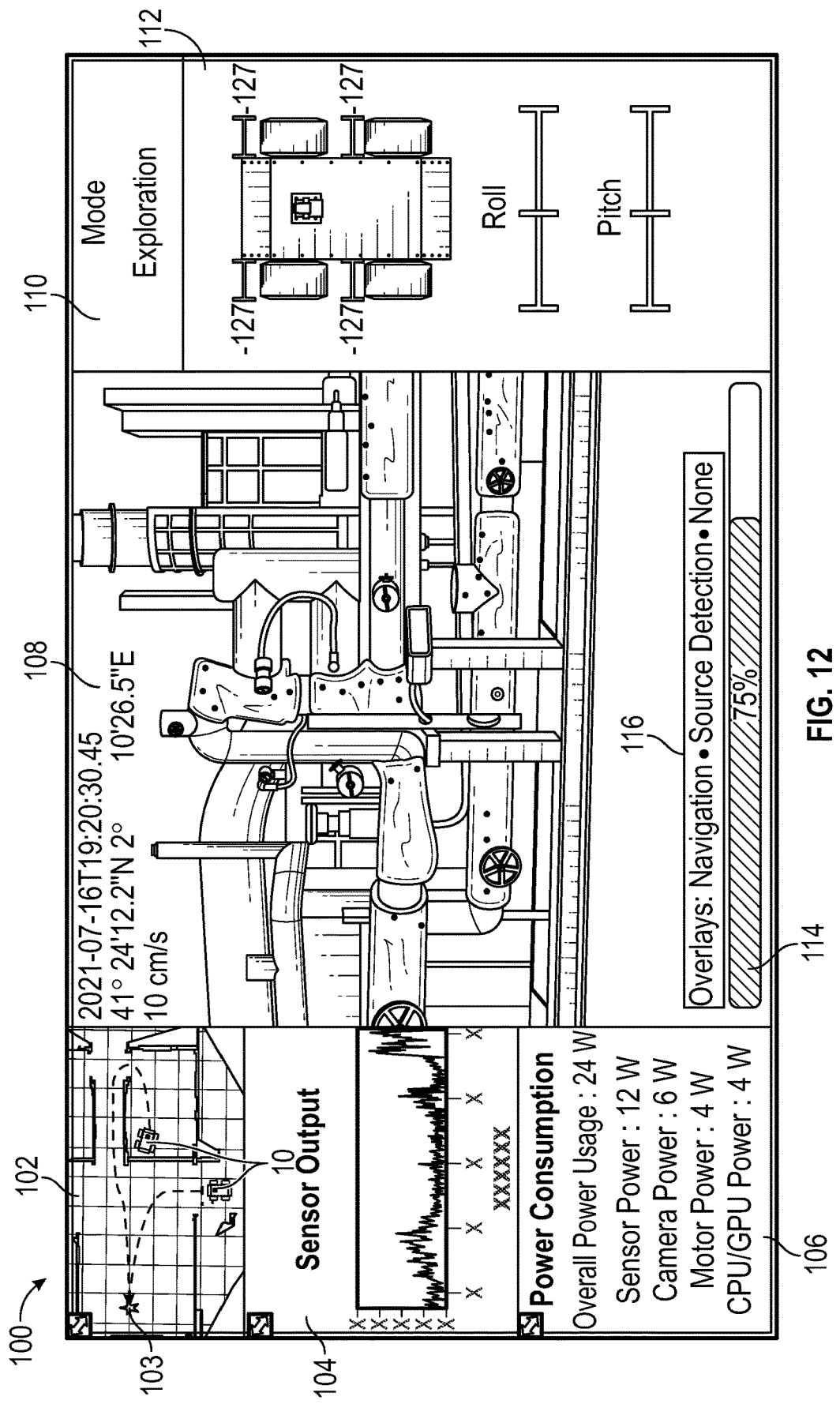
FIG. 12 is a sample user interface associated with user observation and control of a deployed robot at a job site, the user interface viewable on a computer or mobile communication device.
Figure 13:
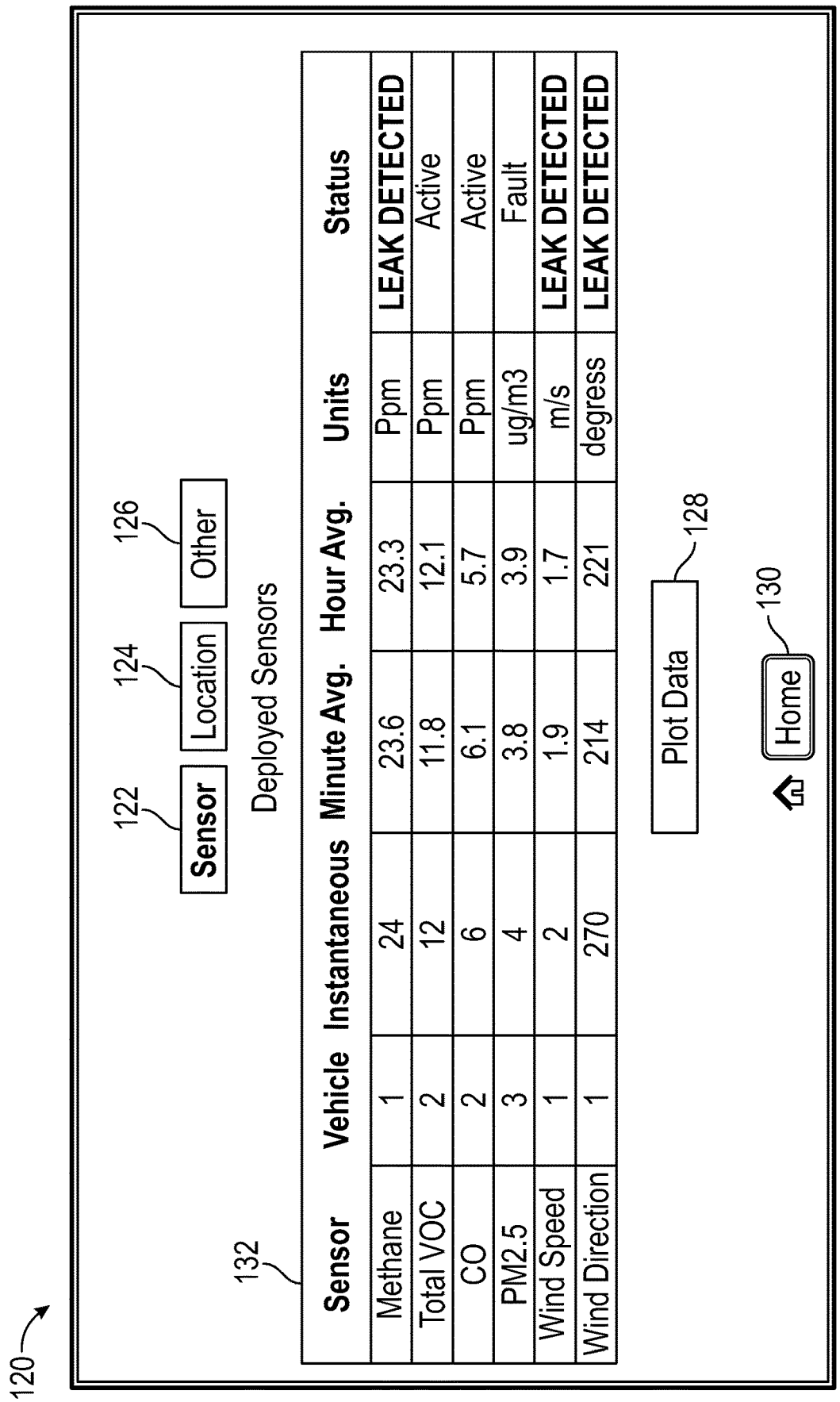
FIG. 13 is another sample user interface showing data associated with sensors and environmental conditions.

Considering the foregoing exemplary computer and communications network and elements described herein, it may also be considered a software program or software platform with computer coded instructions that enable execution of the functionality associated with the user interface of FIGS. 12-14 described herein. More specifically, the invention may be considered a software program or software platform that enables monitoring and detection of gas leaks at a jobsite. The software program or platform may further include recommended options for a user that are automatically generated based on predetermined logic associated with the type of gas leak encountered, where the leak occurred in the oil and gas facility or other location where the robotic vehicles are deployed.

In connection with another embodiment of the invention, it may be considered a combined software and hardware system including (a) a software program or software platform with computer coded instructions that enable execution of the functionality associated with the user interfaces of FIGS. 12-14.

In connection with yet another embodiment of the invention, it may be considered a sub-combination including one or more user interfaces generated by the software.

FIG. 12 illustrates one example of a user interface or user screen 100 viewable on a computer or mobile communication device. The purpose of the user interface is to enable an operator to view the status of a robotic vehicle during operation, and to issue or supplement commands to the robotic vehicle so that it may most efficiently locate the source of a gas leak. The vehicle is commanded via a touch-screen user interface, which may be viewed using any type of touch-screen device (tablet, smart phone, laptop computer, etc.). The user commands the vehicle by setting "waypoints" on the jobsite; this is accomplished by pressing and holding a selected location on the virtual map displayed on the screen. A waypoint is created at the location pressed by the user, and a navigation path between the robot's current location and the waypoint is automatically calculated by the software. This navigation path is updated in real-time using input sensor data from the previously-described navigation sensors aboard the robot. Multiple waypoints may be created in the same manner and connected by paths based on the order they were created; they may also be re-ordered using the touch-screen interface to control the order in which the robot visits them. The robot may also be commanded to drive through/scan an area by drawing a polygon with a stylus or the user's finger on the touch screen; polygons are created by setting 3 or more waypoints, connecting them with a path, then selecting "area survey" in the control interface. Once all of the waypoints or polygons are defined on the virtual map, they are automatically uploaded to the robot and the user may select "Go" to command the robot to begin driving it's pre-programmed course. The robot will continue to navigate between waypoints, adjusting its course as new input is received from the navigation sensors, until it either reaches the final waypoint/edge of polygon or is commanded to "Stop" by the user. A virtual map 102 is viewable and which represents a layout of a particular job site where the robotic vehicle is operating. The movement or path of the robotic vehicle in this virtual map is designated by dashed lines. Infrastructure located at the job site is presented to the user as viewing the infrastructure from a view above the vehicle. One or more points 103 may be highlighted on the virtual map as corresponding to the location of a presumptive leak or a location of interest where gas concentration readings reach a threshold magnitude indicating a leak is likely in close proximity. The generated map could be one that is produced by the robotic vehicle, or a map that has been pre-generated by system software. The provision of the virtual map assists an operator in understanding the movements of the robotic vehicle and the significance of the various paths taken by the vehicle to find the source of the leak. A sensor output 104 may also be viewable on the user screen 100. The sensor output as shown is in graphical form in which the vertical axis could represent gas concentration while the horizontal axis could represent time or location. The sensor output 104 is intended to display real-time data received from the optical mapping camera or other sensors. The ability to view sensor outputs is also valuable in providing an operator the past or present status of the vehicle during search and exploration. Power consumption readings 106 are also illustrated in which power consumption pulls over designated times also assist in operator confirming normal or expected operation of the various vehicle components. Excess consumption or less than normal power consumption may indicate a mechanical or electrical failure of one of the components. A video image 108 is also provided on the user interface that allows an operator to view where the robotic vehicle is at that moment and also assists the operator in determining where a leak may be occurring by the presence of visibly damaged piping or equipment. The video feed/image 108 can be overlaid with additional data, such as visualization of the sensor data or visualization of the navigation data. For sensor data, this can be displayed as an overlaid methane plume that covers an area of the image. Navigation data could include hazards identified by the central computer or predesignated hazards. The view provided on video image 108 can be generated, for example, by the front or rear depth cameras 224/226. Also a. On the video image is a date/time stamp, latitude and longitude coordinates, and a real-time speed of the vehicle at the moment the image was taken. An operator may select the robotic vehicle mode of operation, either the search mode (the mode conducted when searching for the source of the leak) or the expiration mode (the mode conducted when fortifying gathering data on a specific leak). A vehicle status 112 is provided which shows the representation of a vehicle and vehicle parameters at that time. Vehicle parameters could include the roll and pitch and motor statuses and commands (such as real-time pulsed width modulated (PWM) signals to each motor). The vehicle status 112 may also highlight any faults detected by changing the color of the faulted component/subsystem of the depicted vehicle. A battery status meter 114 shows the remaining battery capacity, such as in the illustrated bar graph format. Selection bar 116 allows the user to select a desired overlay, such as a navigation overlay, a source detection overlay, or no overlay.

FIG. 13 illustrates another user interface 120 which provides detailed information on sensor data and ambient environmental conditions. This interface 120 provides the operator with a button 122 to select the detailed sensor data (FIG. 13), detailed location data 124 (FIG. 14) or some other selected data 126. The sensor data provided in FIG. 13 is in a table form 132 including both sensor data and ambient environmental condition data. The sensors listed may be those specific sensors aboard one or more robotic vehicles at a particular job site. The vehicle column indicates the number of vehicles present with the corresponding sensors. One of the vehicles also has functionality for measuring wind speed and wind direction, such as an onboard anemometer. The instantaneous column indicates that the sensor readings being viewed are real-time sensor readings of. The minute average column indicates the output of selected sensors, averaged over a designated period of time. It is often useful to identify leak rates which can be quantified by measuring the minute average leak. The hour average column indicates the output of selected sensors, averaged over an hour. This hour average reading can be useful to also identify leak rates and to discard erroneous instantaneous readings or erroneous minute average leaks. The units column indicates the unit of measurement such as parts per million which would be appropriate for measuring methane leaks or other gas leaks such as carbon monoxide (CO) or volatile organic compounds (VOC). The unit of measurement for the presence of particulate matter (particulate matter 2.5 micron (PM 2.5)) is shown as $ug/m^3$. Wind speed is measured at meters per second and wind direction is measured in angular degrees. The status column indicates the present status of the monitored item. In the example, a leak is detected for methane. For total VOC and CO, the "active" indication means that the robotic vehicle is presently searching for the contaminant and has yet to locate its source. The particular matter sensor indicates that it has a fault, which could be a self-reporting error from the vehicle. For the wind speed and wind direction, the leak detected indication means that wind speed and wind direction at the time do not override the conclusion of a detected leak. In the event of high winds, leaks may be more difficult to find. An indication of high wind speeds in the status column indicates that leak may be unreliable at that time. The plot data button 128 allows the user to view another user interface (not shown) that produces instantaneous, minute averaged, and our averaged sensor data in a graphical format, similar to the graphical format illustrated for sensor output 104. Any or all of the user interface screens may include navigational buttons, such as button 130 which returns the user to a home screen.

FIG. 14 illustrates another user interface 140 which provides detailed information on a selected location 124 including the robotic vehicles present, the status of the sensors and leak detection at the location. In this view, a site map 142 of the location as well as robotic vehicle present at the location are shown on the map. The site map 142 is shown larger in this view allowing the user to see more detail within the map and the specific locations of the robotic vehicles. A source location indicator 143 is shown which represents the exact location of the source of a detected leak. In this example, vehicles 1, 2 and 3 have all detected the leak marked by the source indicator 143 and each is vehicle is directed on a path to approach and explore the detected leak. A table 144 is also provided to show the robotic vehicles in operation, the particular site where the vehicle are located, and the status of leak detection operation. Multiple robotic vehicles may be stationed that multiple jobsites. The user may click on the vehicle number to produce another user interface (not shown) that shows the particular sensors aboard that vehicle, the sensor data associated with the onboard sensors, and the real-time video feed produced from that vehicle. Similarly, the user may click on the site number to view the robotic vehicles stationed at the site, the enlarged site map, and the locations of any leaks detected at that site. The status column in table 144 is similar to the status column in FIG. 13 in that this column shows the present status of the vehicle. As illustrated, vehicles 1, 2, 3 have presently detected a leak. Vehicles 4, 7 and 8 are in the search mode. Vehicles 5, 9 and 10 are presently idle. Vehicle 6 shows a fault condition.

One should be able to appreciate that the user interfaces of FIGS. 12-14 provide robust user interface capabilities which enable all stakeholders to monitor real-time and historical data and system information.

The robotic vehicles of the invention may operate in a variety of settings where methane leaks may be present. Many of these locations are related to oil and gas installations such as production wells, storage tanks, pipelines, and urban distribution networks. However, these locations are simply exemplary and the robotic vehicle of the invention can be used at any location where there may be a gas leak.

Because of the autonomous capabilities of the robotic vehicle, the vehicle can be used to replace personnel patrolling a site or existing methane sensor systems that may not be capable of pinpointing the source of the leak. The robotic vehicle is mobile and can actuate leak source detection vertically by use of the extendable mast. Therefore, because of the nearly limitless horizontal and vertical sensor capabilities, this enables a robotic vehicle to pinpoint sources of gas leaks quickly and with extreme accuracy. Static/stationary sensors installed at some locations simply cannot pinpoint the source of the leak which still requires the use of personnel to patrol the locations.

While the invention is set forth herein in multiple preferred embodiments, it should be understood that the invention is not strictly limited to these preferred embodiments. The breadth of the invention should therefore be considered commensurate with the scope of the claims appended hereto.

What is claimed is:

1. A robotic vehicle for detecting a source of interest, comprising:
   a vehicle frame;
   electric drive motors mounted to the vehicle frame;
   wheels connected to drive shafts of the drive motors;
   motor controllers communicating with the drive motors to selectively control rotational movement of the wheels;
   an extendable and retractable mast assembly mounted to the frame, the mast assembly including a mast base and a mast;
   a source detection sensor positioned at an upper end of the mast;
   a central computer secured within the vehicle for controlling autonomous operation of the vehicle, said central computer including at least one processor for executing programming tasks and at least one memory element for storing data;
   a first software application integral with said central computer for receiving data and for executing commands to control the vehicle through a processor of said central computer, said controlling comprising selectively raising and lowering said mast assembly to obtain sensor readings at different heights, and said data including navigational data, sensor data obtained at the different heights, environmental data, and user defined data; and
   at least one navigational camera mounted to the vehicle for providing visual images of an environment in which the vehicle operates.

2. The robotic vehicle of claim 1, further including:
   an external network gateway communicating with the central computer to facilitate flow of data between communication networks associated with the vehicle.

3. The robotic vehicle of claim 1, further including:
   an RTK GPS unit communicating with the central computer to facilitate determining a location of the vehicle through a GPS link.

4. The robotic vehicle of claim 1, further including:
   an IMU unit integral with the central computer to establish a spatial orientation of the vehicle during operation.

5. The robotic vehicle of claim 1, further including:
   a GPU communicating with the central computer to manage graphics rendering tasks associated with display of selected data and visual images to a remote display device.

6. The robotic vehicle of claim 1, wherein:
   said navigational camera includes at least one of a monocular camera, a stereoscopic camera, or a combination thereof.

7. The robotic vehicle of claim 1, further including:
   a pan/tilt mechanism secured to the upper end of the mast adjacent the source detection sensor, said pan/tilt mechanism being operated to control tilt and rotation of said source detection sensor via electronic commands.

8. The robotic vehicle of claim 1, wherein:
   said source detection sensor is an optical camera.

9. The robotic vehicle of claim 8, wherein said optical camera is an infrared camera.

10. The robotic vehicle of claim 1, wherein:
    said central computer includes a central processing unit that executes a plurality of functions associated with operation of said robotic vehicle, said plurality of functions including; (a) state estimation facilitated by a linear quadratic estimation algorithm used to fuse data from different sensor sources to create an accurate prediction of where said robotic vehicle is located and how said vehicle is moving; (b) at least one source detection and navigation/integration algorithm used for locating and pinpointing a source of a gas leak; (c) path planning logic associated with defining a path of travel of said robotic vehicle in a three-dimensional environment; and (d) a robot controller function used to parse computer coded path instructions and translating them to commands that can be used by said motor controllers.

11. A system for detecting a source of a gas leak, comprising:
    a robotic vehicle for detecting a source of a gas leak, said robotic vehicle including:
    (a) an extendable and retractable mast assembly mounted to the robotic vehicle, the mast assembly including a mast base and a mast;
    (b) a gas detection sensor positioned at an upper end of the mast; and
    (c) a central computer secured within the robotic vehicle for controlling autonomous operation of the vehicle, said central computer including at least one processor for executing programming tasks and at least one memory element for storing data, the programming tasks including:
       maneuvering the robotic vehicle according to predetermined path in a search mode; and
       operating the robotic vehicle according to an exploration mode for determining whether a set of goal conditions are met;
    an external network gateway communicating with the central computer to facilitate flow of data between communication networks associated with the vehicle;
    a first software application integral with said central computer for receiving data and for executing commands to control the vehicle through a processor of said central computer, said data including navigational data, sensor data, environmental data, and user defined data;
an external network gateway communicating with the central computer to facilitate flow of data between one or more communication networks associated with the vehicle;
a second software application communicating with said robotic vehicle to receive data, display data, and to selectively transfer data to one or more remote computing or communication devices within a communications network of said one more communication networks, said second software application comprising a plurality of user interfaces for displaying said data associated with operational functions of said robotic vehicle including recorded data for detected gas concentrations and locations where said gas concentrations were detected; and
at least one of a mobile communication device or remote computer that runs said second software application wherein the remote display device is incorporated in said mobile communication device or remote computer and wherein at least one user interface is generated on the remote display device that displays said recorded data for detected gas concentrations and said locations where said gas concentrations were detected.

12. The system of claim 11 wherein:
said robotic vehicle further includes a vehicle frame, electric drive motors mounted to the vehicle frame, wheels connected to drive shafts of the drive motors, motor controllers communicating with the drive motors to selectively control rotational movement of the wheels, and at least one navigational camera mounted to the vehicle for providing visual images of an environment in which the vehicle operates.

13. The system of claim 11 wherein said robotic vehicle further includes:
an external network gateway communicating with the central computer to facilitate flow of data between communication networks associated with the vehicle.

14. The system of claim 11 wherein said robotic vehicle further includes:
an RTK GPS unit communicating with the central computer to facilitate determining a location of the vehicle through a GPS link.

15. The system of claim 11 wherein said robotic vehicle further includes:
an IMU unit integral with the central computer to establish a spatial orientation of the vehicle during operation.

16. The system of claim 11 wherein said robotic vehicle further includes:
a GPU communicating with the central computer to accelerate navigation localization and mapping and support the training and deployment of neural models.

17. The system of claim 11, wherein:
said central computer includes a central processing unit that executes a plurality of functions associated with operation of said robotic vehicle, said plurality of functions including; (a) state estimation facilitated by a linear quadratic estimation algorithm used to fuse data from different sensor sources to create an accurate prediction of where said robotic vehicle is located and how said vehicle is moving; (b) at least one source detection and navigation/integration algorithm used for locating and pinpointing a source of a gas leak; (c) path planning logic associated with defining a path of travel of said robotic vehicle in a three-dimensional environment; and (d) a robot controller function used to parse computer coded path instructions and translating them to commands that can be used by said motor controllers.

18. A method for detecting a source of a gas leak, comprising:
providing a robotic vehicle including: an extendable and retractable mast assembly mounted to the robotic vehicle, a gas detection sensor positioned at an upper end of the mast, and a central computer secured within the robotic vehicle for controlling autonomous operation of the vehicle, said central computer including at least one processor for executing programming tasks and at least one memory element for storing data;
positioning the robotic vehicle at a jobsite where a gas leak is suspected;
generating commands for the robot to commence movement at the jobsite, said commands being processed by said central computer to actuate electric motors of said robotic to move said vehicle toward a detected leak, said commands being generated from a source detection algorithm based on a gradient descent model, wherein said commands continually refine a position of the robotic vehicle so that it moves to an area of high probability of increased gas concentration;
predetermining a path of travel for said robotic vehicle based on initial gas concentrations detected by said gas detection sensor;
moving said robotic vehicle along said predetermined path in a first search mode;
selectively raising and lowering said mast assembly to obtain sensor readings at different heights as said robotic vehicle travels and when said robotic vehicle comes to a stop;
determining, by said central computer, whether said sensor readings satisfy one or more conditions indicating a likelihood of a detected leak near or at a present location of the robotic vehicle where sensor readings are taken;
determining, by said central computer, when said conditions are satisfied to then operate said robotic vehicle in an exploration mode;
operating said vehicle in said exploration mode to determine when goal conditions are met, said goal conditions defined as data recorded in an area where said gradient descent model indicates the presence of a higher concentration of gas; and
confirming the source of the leak is found by iterative executions of said gradient descent model that are stable.

19. The method of claim 18, wherein:
said central computer includes a central processing unit that executes a plurality of functions associated with operation of said robotic vehicle, said plurality of functions including; (a) state estimation facilitated by a linear quadratic estimation algorithm used to fuse data from different sensor sources to create an accurate prediction of where said robotic vehicle is located and how said vehicle is moving; (b) path planning logic associated with defining a path of travel of said robotic vehicle in a three-dimensional environment; and (c) a robot controller function used to parse computer coded path instructions and translating them to commands that can be used by said motor controllers.

20. The method of claim 18, further including:
executing a user interface software application communicating with said robotic vehicle to receive data, display data, and to selectively transfer data to one or more remote computing or communication devices within a communications network, said user interface software application comprising a plurality of user interfaces for displaying data associated with operational functions of said robotic vehicle including recorded data for detected gas concentrations and locations where said gas concentrations were detected.

* * * * *